United States Patent [19]
Moncrief et al.

[11] Patent Number: 5,638,659
[45] Date of Patent: Jun. 17, 1997

[54] PACKAGING MACHINE

[75] Inventors: Frank N. Moncrief, Acworth; Herman J. Steinbuchel, IV, Marietta; Steven Brown, Canton, all of Ga.

[73] Assignee: Riverwood International Corporation, Atlanta, Ga.

[21] Appl. No.: 577,188

[22] Filed: Dec. 22, 1995

[51] Int. Cl.$^6$ .................................................. B65B 35/30
[52] U.S. Cl. ...................... 53/448; 53/48.7; 53/251; 53/462; 53/543
[58] Field of Search ........................ 53/448, 462, 251, 53/543, 48.7, 48.8, 48.9

[56] References Cited

U.S. PATENT DOCUMENTS

| | | | |
|---|---|---|---|
| 3,417,540 | 12/1968 | Copping et al. | 53/448 X |
| 3,660,961 | 5/1972 | Ganz | 53/448 X |
| 4,642,967 | 2/1987 | Culpepper | 53/543 X |
| 4,982,551 | 1/1991 | Nigrelli, Sr. | 53/543 X |
| 5,237,795 | 8/1993 | Cheney et al. | 53/543 X |
| 5,515,668 | 5/1996 | Hunt et al. | 53/543 |

*Primary Examiner*—Daniel Moon

[57] ABSTRACT

A packaging machine (5) for moving a spaced series of groups of containers along a path of travel in a packaging machine line is disclosed. The packaging machine includes a variable pitch lugged conveyor belt assembly (12) having a pair of conveyor chains (61, 62) equally spaced from a longitudinal axis extending along the path of travel, and a pair of generally parallel side guides (17) mounted one each on a pair of accessory rails (14) movably supported on the framework (7) of the packaging machine, and extending along opposite sides of the path of travel. The conveyor chains are constructed to be moved laterally toward and away from each other, and the side guides are constructed to be simultaneously moved laterally toward and away from the conveyors with the accessory rails, respectively, as the conveyor chains are moved. Each conveyor chain includes a spaced series of pop-up lug assemblies (63) in which a pop-up lug (92) of each assembly can be individually selected for reciprocal movement from a lowered position flush with respect to the surface of the conveyor chain into a raised position extended above and with respect to the surface of the conveyor chain for varying the pitch of the pop-up lugs along the length of the conveyor chains. Each conveyor chain also includes a plurality of modular table-top lugs (65) which are constructed to be yieldably urged into position on an endless chain (84).

16 Claims, 16 Drawing Sheets

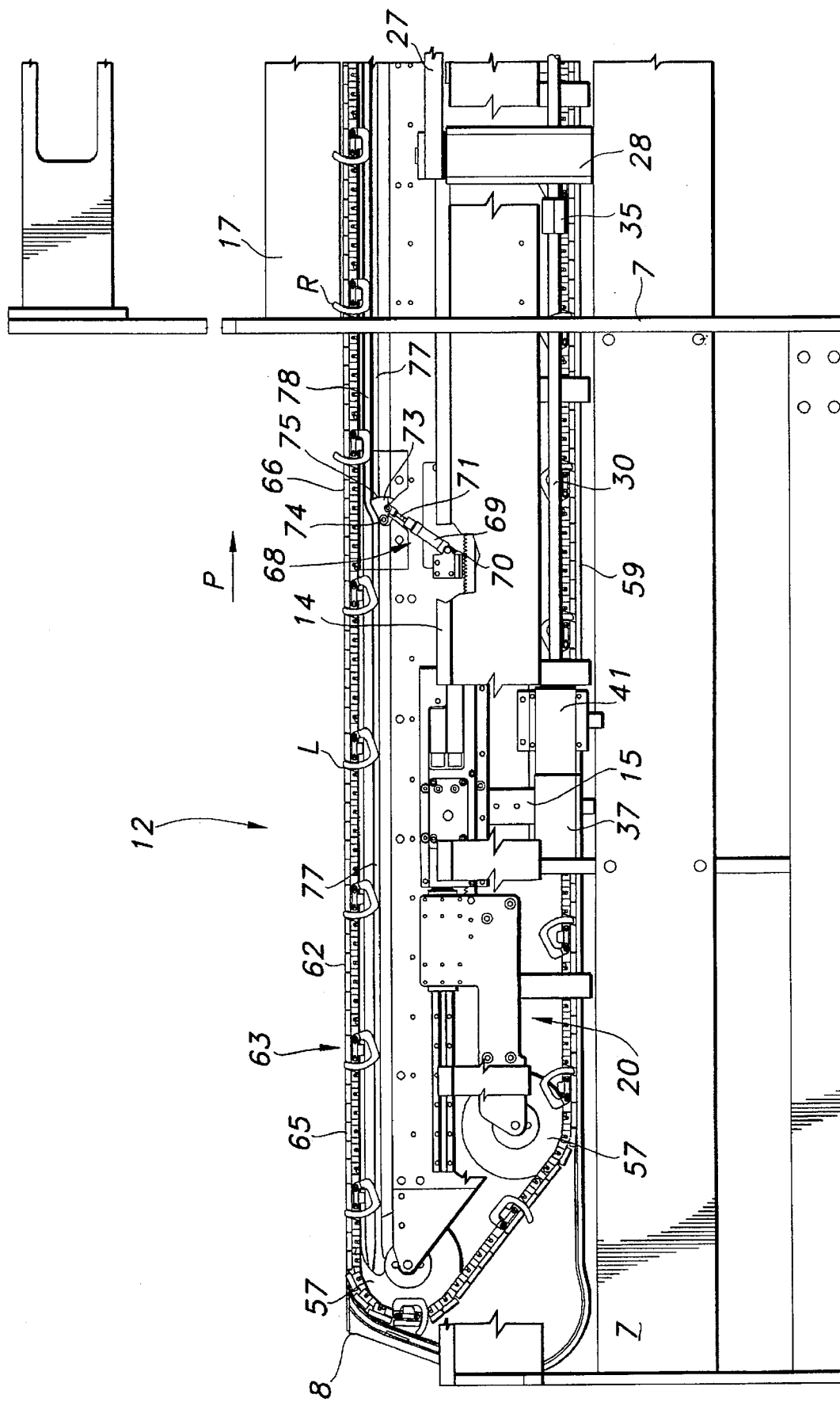

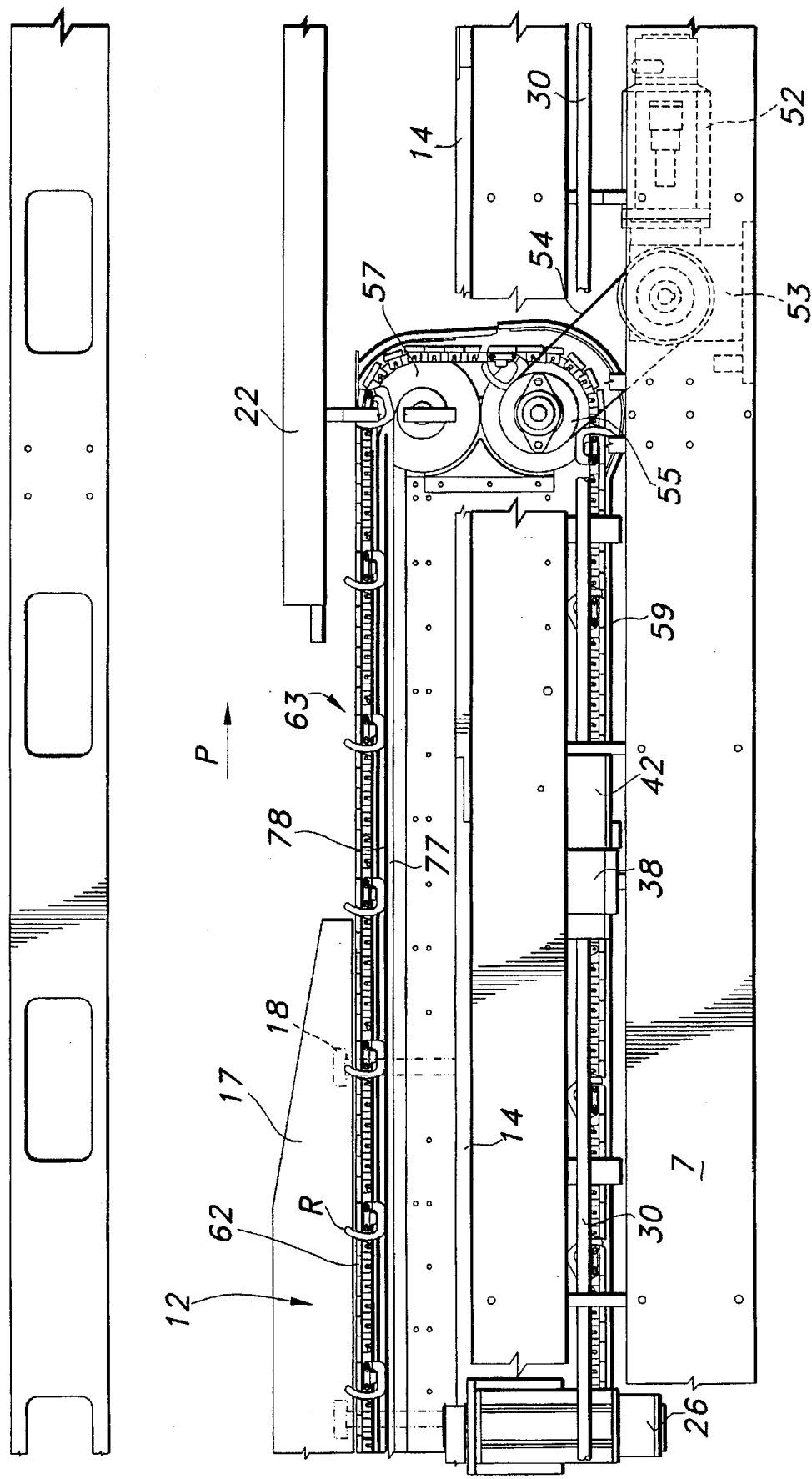

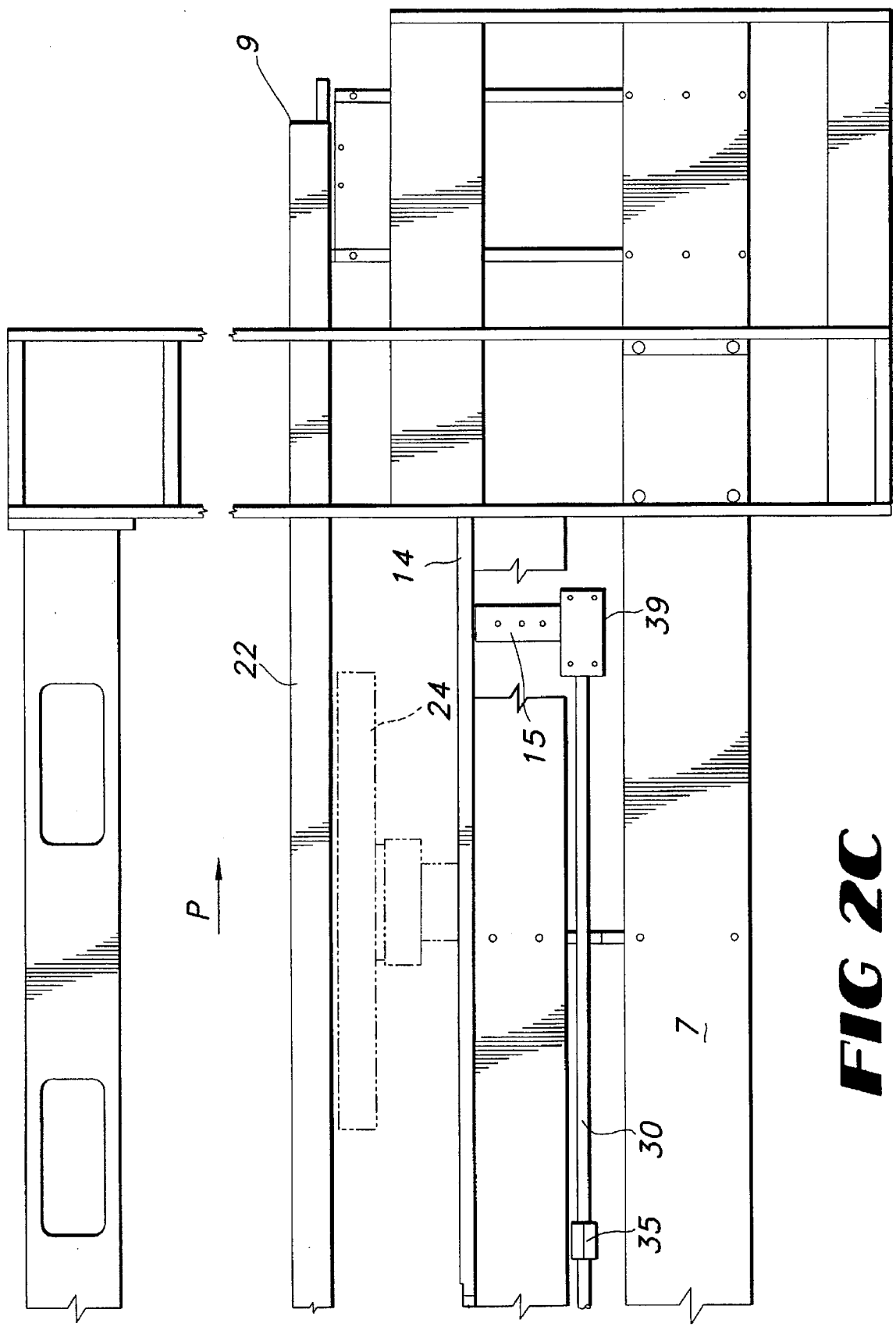

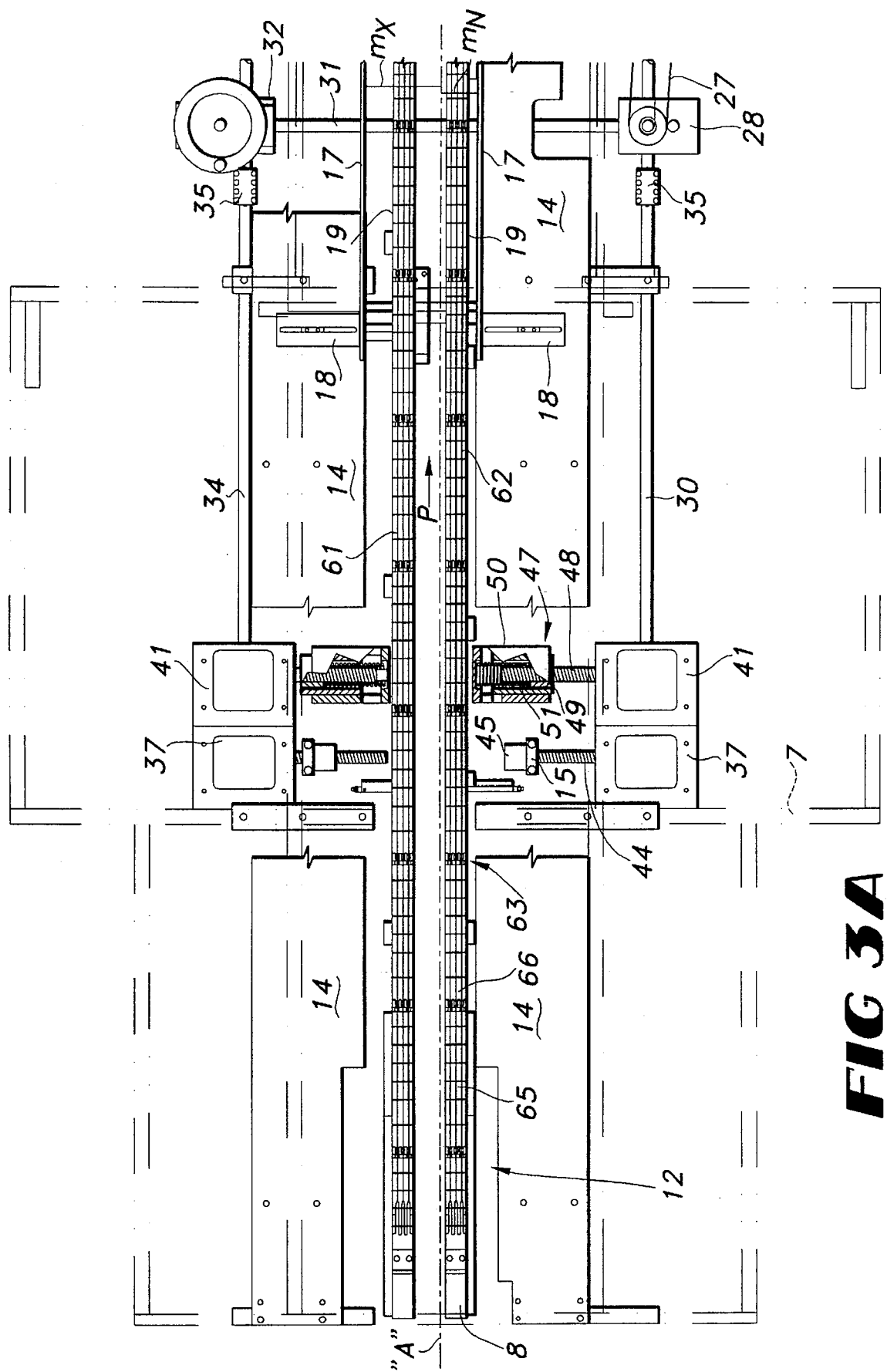

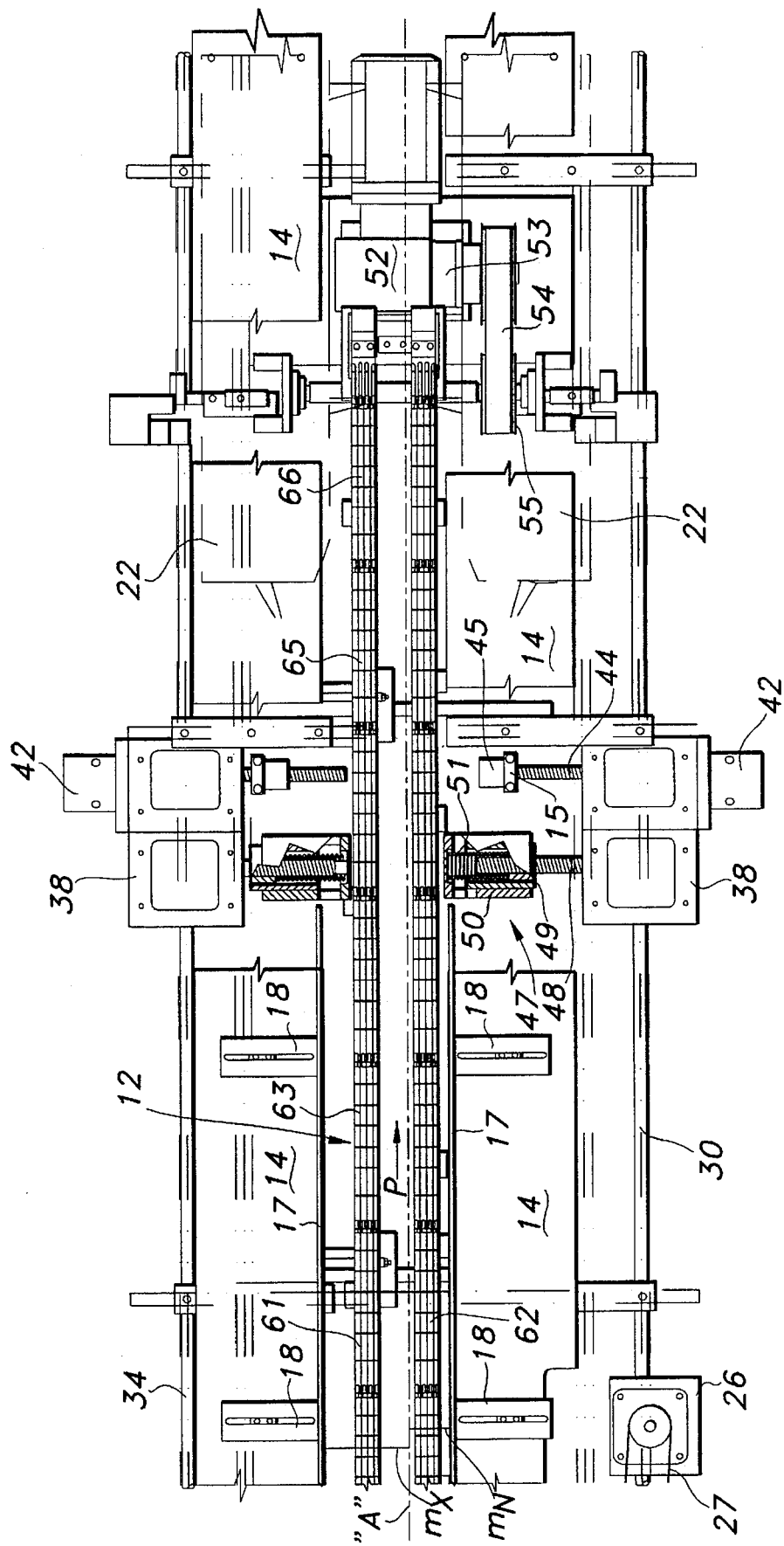

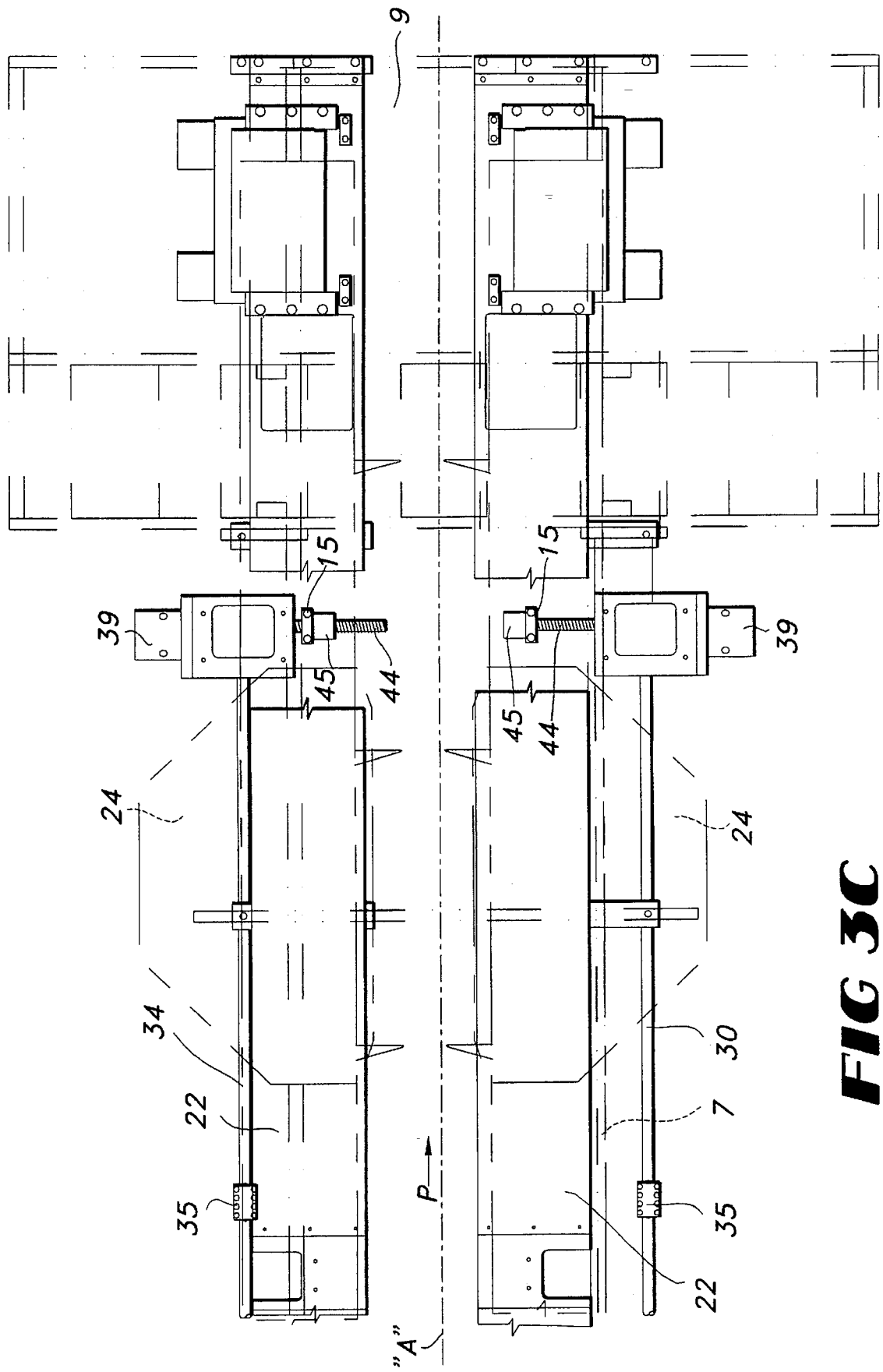

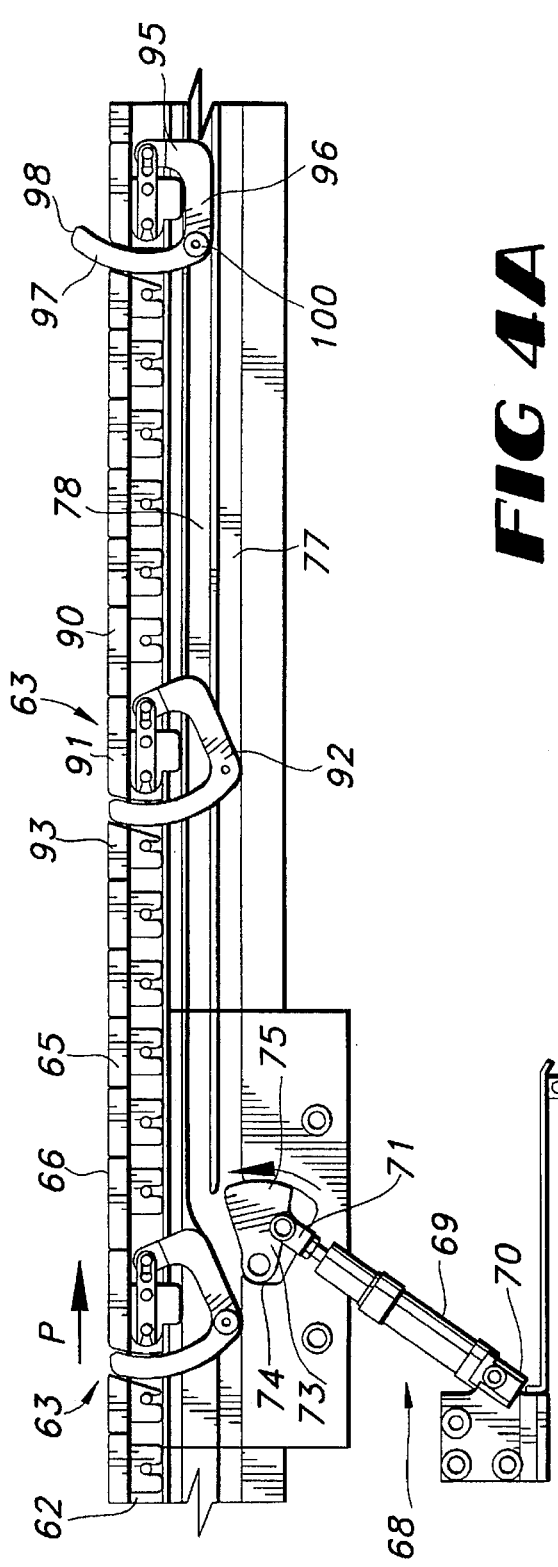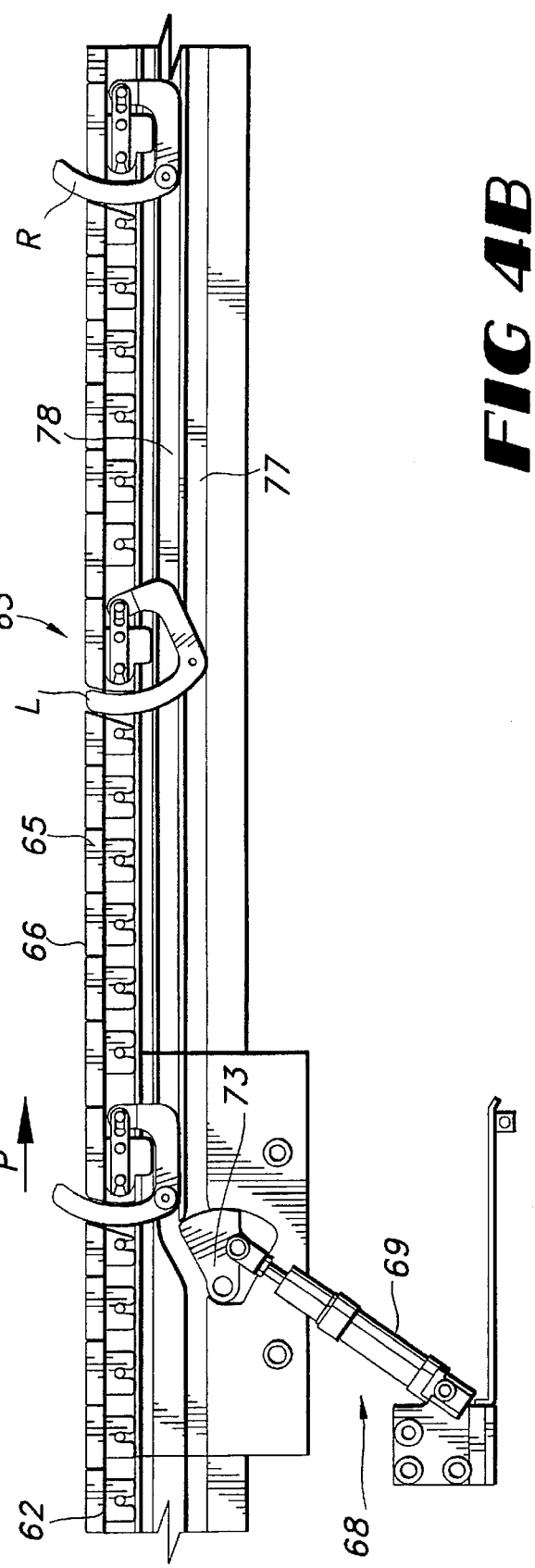

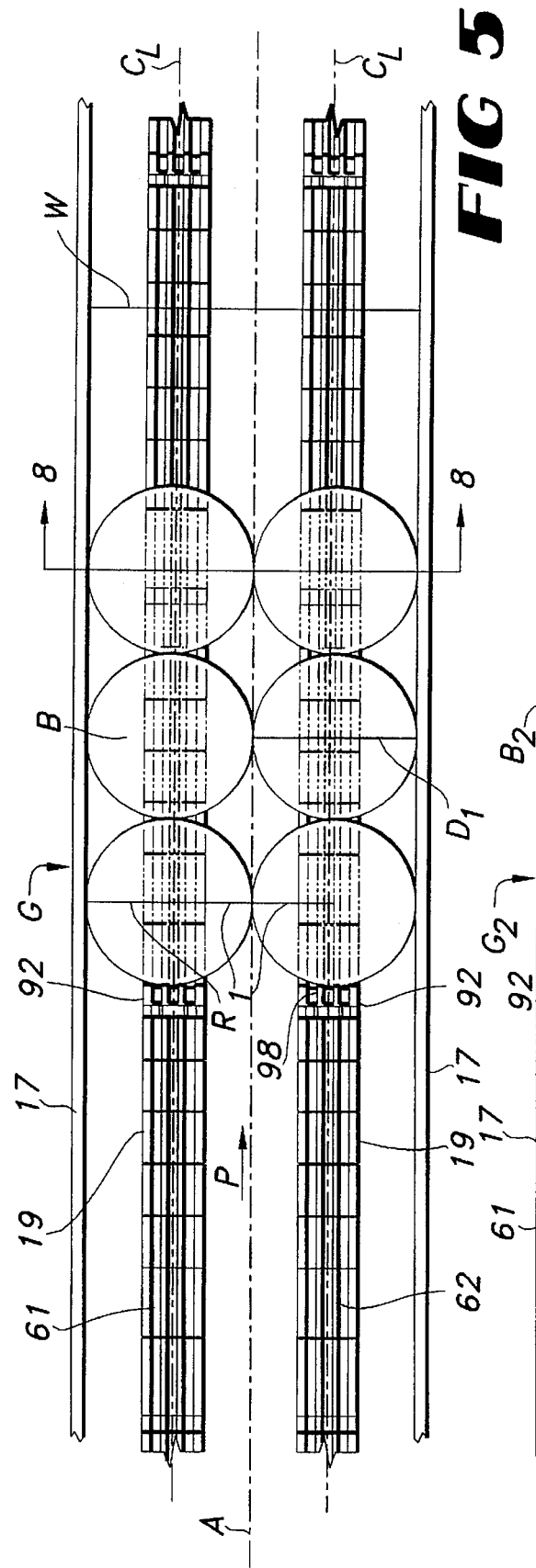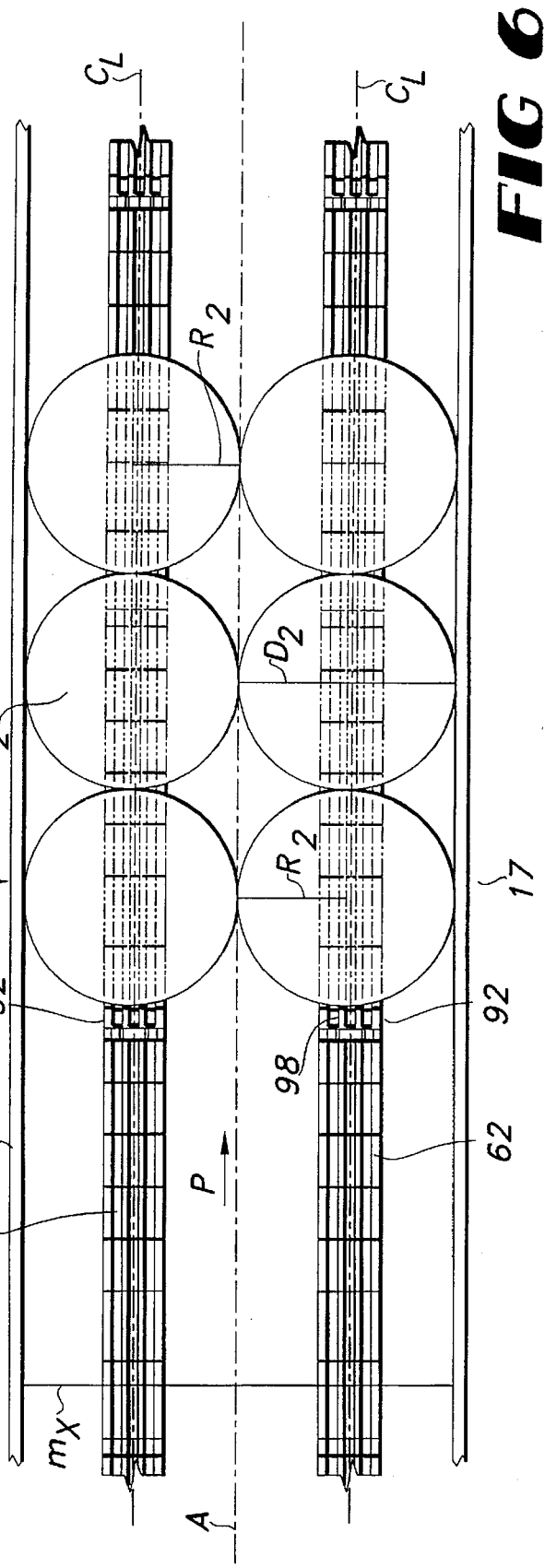

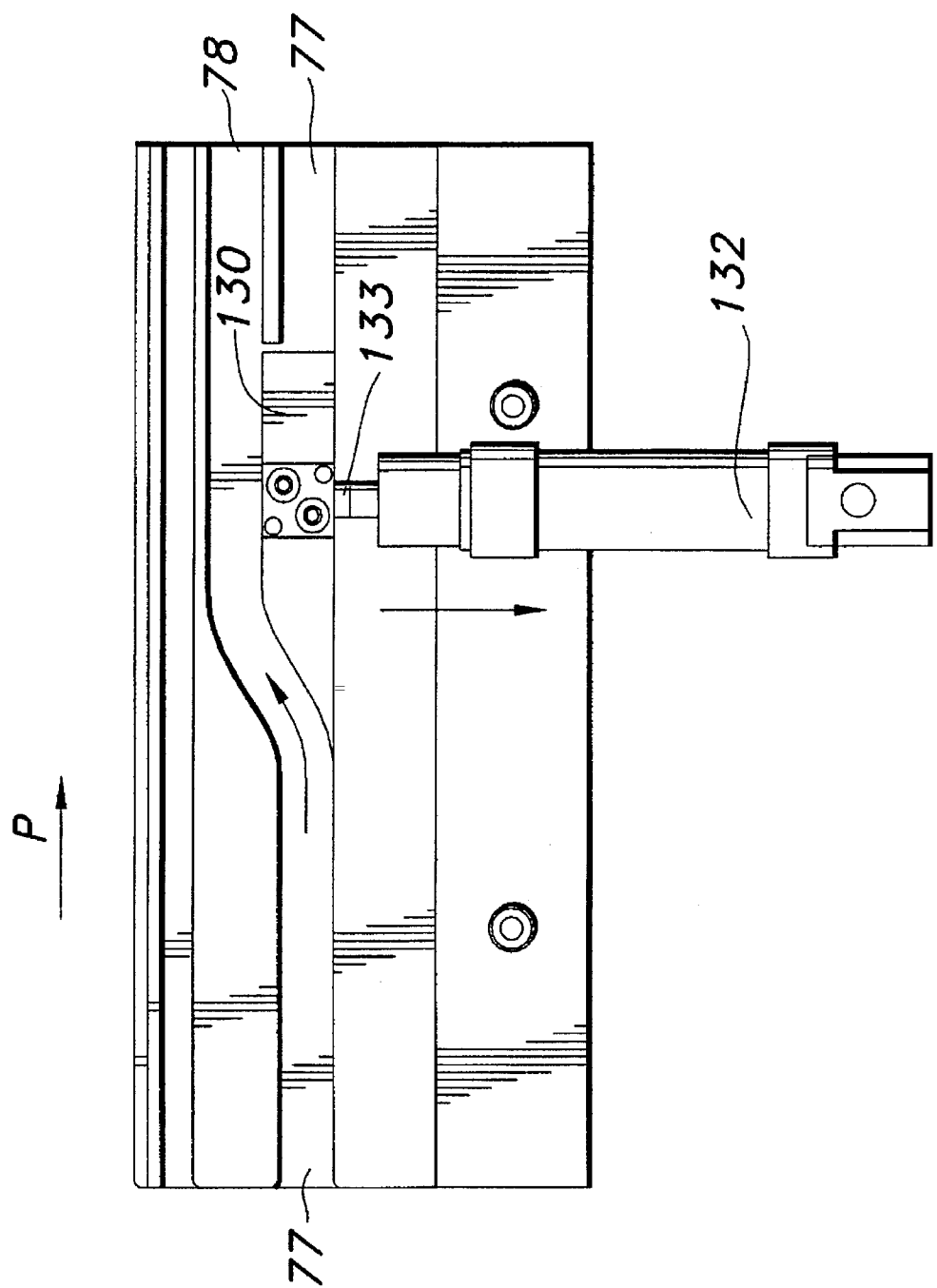

PACKAGING MACHINE

FIELD OF THE INVENTION

This invention relates in general to packaging machinery. More particularly, this invention relates to a novel method and apparatus for moving a spaced series of articles of product along a path of travel through a packaging machine, the packaging machine being constructed and arranged to vary the spacing of the articles of product moved along the path of travel, and to move groups of articles of product of varying sizes along the path of travel.

BACKGROUND OF THE INVENTION

Packaging machines, in general, are well known in the art and are used in a number of industrial applications. Over time, packaging machines have evolved for use in specific industry applications, for example, for use in packaging foodstuffs, and/or for use in packaging beverage containers to include groups of bottles and cans moved along a path of travel in modern high speed processing/packaging operations.

Common to most packaging machines is the use of a flighted conveyor having a spaced series of lugs or timing pins which extend upward with respect to the surface of the conveyor belt, spaced along the length of the conveyor belt. These lugs or timing pins are used to push the articles of product downstream along the path of travel, and to index the articles of product into groups as each flight is phased or pitched with respect to the other. The pitch of a flighted conveyor is generally defined as the distance between the front of one lug or timing pin to the front of the next following lug or timing pin and represents the amount of space, less the dead space, i.e. the space taken along the conveyor belt, or chain, by the lug assembly itself, and in which an article of product, or group of articles of product, can be moved along the conveyor belt in series. The use of lugs or timing pins also helps to prevent articles of product from sliding backward or out of timed relationship with one another as they are moved along the path of travel, and are particularly useful for positioning articles of product when carton blanks or paperboard carders are placed over groups of beverage containers, for example, to include bottles or cans.

As used in modern beverage packaging operations, the packaging machine is supplied with an untimed mass flow of beverage containers on a chain or belt conveyor moving the containers toward the infeed end of the packaging machine. Before being passed into the packaging machine, the untimed mass of beverage containers is typically passed through at least one star wheel to time or space the containers with respect to one another, the containers then being passed to a selector screw, which is a helical screw used to phase individual beverage containers into spaced groups of containers for delivery to the infeed end of the packaging machine. Thereafter, and in the typical packaging machines known in the art, the group of beverage containers may be enclosed within a carton blank forming a paperboard carrier for use in shipping and transporting the beverage containers.

Common to these known packaging machines is the use of flighted conveyors. A common usage of a flighted conveyor in a packaging machine is to provide an elongated chain conveyor having a spaced series of lugs or timing pins extending upwardly therefrom through a static dead plate, or a live conveyor, i.e., a moving conveyor, upon which the articles of product are slid or otherwise moved or carried along the path of travel. Flighted conveyors have proven themselves to be reliable and durable, however the use of conventional flighted conveyors is limited because the lugs or timing pins are generally fixed in position along the length of the chain conveyor, and thus the pitch, i.e., the spacing, of the groups of articles of product along the path of travel cannot be changed on the fly. Rather, in order to change the pitch of the flights, the packaging machine must be shut down and the chain conveyor either replaced with a chain conveyor having lugs set to the newly desired pitch, or the existing chain removed, the timing lugs moved and repositioned, and the chain then repositioned back on the packaging machine. All of this leads to increased production costs in handling and changing over the conveyor belts, plus delays in production time.

Essentially, once a chain conveyor with fixed lugs or timing pins is placed on the machine, the pitch of the articles of product is set and cannot be changed without changing the position of the timing pins on the belt, or changing the belt itself, all of which requires a production shutdown rather than a quick changeover on the fly. Accordingly, conventional flighted chain conveyors are not well suited for high volume high speed packaging operations where quick product size changeovers may occur. One way of solving this problem is to have several production lines with chain conveyors of differing pitches or phases for handling articles of product in differently phased or spaced groups. This, however, has the effect of increasing production costs by utilizing the duplication of packaging lines rather than requiting one single packaging line constructed to handle all needed packaging operations.

Thus, what is needed, but seemingly not available in the art, is a single packaging machine adapted for use with groups of beverage containers of differing sizes which may require different spacing or phasing along the path of travel through the packaging machine, with the ability to change the pitch of the conveyor belt along the path of travel on the fly without otherwise having to stop the packaging machine. Modem packaging operations demand flexibility and versatility which is not otherwise available in the known flighted chain conveyors in the art.

One attempt made in the prior art to overcome the problem of having fixed timing pins along the length of a chain conveyor is to raise or lower an entire series of lugs, or every other lug, along the length of a conveyor belt by raising and lowering a guide track in which the lugs are captured or guided, which has the effect of raising or lowering all of the lugs, or every other lug, in unison along the length of the conveyor. This, however, does not solve the problem of how to vary the pitch of the lugs, or flights, along the length of the conveyor belt as articles of product are still moved in a fixed series, or fixed pitch, along the length of the conveyor belt when the timing pins are raised or lowered as a group. Thus, the need still exists in the art for a variable pitch lugged conveyor belt to be used in a packaging machine adapted for handling groups of articles of product of differing sizes.

Attempts have also been made in the art to provide a flighted chain conveyor with a moving transport surface for moving a spaced series of products along a path of travel on the chain conveyor. However, the problem persists in that the lugs or these conveyors cannot be selectively moved for varying the pitch of the flights along the path of travel. Moreover, should any portion of the transport surface of the chain conveyor be damaged, removal of the chain conveyor is sometimes required in order to replace any damaged components thereof prior to resuming packaging operations. Thus, what is seemingly needed in the art, but unavailable, is a chain conveyor having an easily installed and repairable transport surface with a spaced series of variable pitch lugs provided along the length of the belt which will not otherwise require packaging machine shutdown and/or changeover of machine components in order to process series of articles of product of differing sizes phased differently with respect to one another.

Accordingly, what is needed, but not available in the art, is a packaging machine having a variable pitch lugged conveyor belt assembly which is adaptable for use with differing product shapes, sizes, and phasing or spacing requirements along the path of travel in the packaging machine; as well as a table top chain conveyor adapted for use as a part of the variable pitch lugged conveyor which maximizes machine performance and minimizes machine downtime if repair and/or replacement of chain conveyor components is required.

SUMMARY OF THE INVENTION

The present invention provides an improved method and apparatus for moving a spaced series of single articles of product, or groups of articles of product, along the path of travel through a packaging machine in which the packaging machine is adapted for varying the spacing of different series of groups of articles of product along the path of travel, as well as being readily adapted to package groups of articles of product which may differ in size and shape with respect to one another from a first series to subsequent series of groups of articles of product, in accordance with production requirements.

The present invention accomplishes this task by using a novel method of selectively varying the pitch of a lugged conveyor belt, the conveyor belt being a lugged conveyor chain, along the path of travel which includes the steps of moving the conveyor belt along the path of travel, the conveyor chain being provided with a spaced series of lugs along its length; guiding each of the lugs along the transport surface of the conveyor chain in a lowered position flush with respect to the transport surface; and selectively actuating a cam supported on the packaging machine to separately urge selected lugs into a raised position extending above the transport surface of the conveyor chain for varying the pitch of the flights thus formed along the transport surface of the conveyor chain.

In this improved method, individual lugs can be selected for movement into a raised or lowered position, thus providing an almost infinitely variable pitched and flighted conveyor which provides far greater flexibility and usefulness than other flighted conveyors known in the art. The apparatus for accomplishing this method includes at least one endless conveyor chain supported on the packaging machine, the conveyor chain having a generally horizontal transport surface for transporting articles of product thereon and including a spaced series of lugs positioned along the length thereof, the lugs being constructed and arranged for being individually and reciprocally moved from a lowered position flush with respect to the transport surface into a raised position extending above the transport surface of the conveyor chain. This new packaging machine also includes a cam assembly supported on the packaging machine for urging selected lugs from the lowered position into the raised position, and an actuating assembly for operating the cam assembly to urge the lugs into these respective positions. Each lug includes a cam follower for guiding the lug within elongated cam or guide tracks provided as a part of the cam assembly.

The present invention also presents an improved method and apparatus for moving a spaced series of articles of product of differing sizes and shapes from series to series along the path of travel in the same packaging machine, without the need for using a separate packaging line, and/or for changing over packaging machine components. This novel apparatus includes a pair of spaced and generally parallel conveyor chains supported on the framework of the packaging machine, each of the conveyor chains being spaced equally from a longitudinal axis formed therebetween and extending along the path of travel; and a pair of spaced, generally parallel, and generally vertical side guides movably supported on the framework of the packaging machine, each of the side guides being equally spaced from an external edge of each conveyor chain, respectively, as well as being equally spaced from the longitudinal axis along the path of travel. The conveyor chains are constructed and arranged for lateral movement toward and away from each other, and the side guides are supported on the framework of the packaging machine so that they simultaneously move laterally toward and away from each of the conveyor chains, respectively, as the conveyor chains are moved laterally toward and away from each other.

Thus, an improved method of packaging differing spaced series of articles of product includes the steps of spacing each of a pair of conveyor chains equally apart from a longitudinal axis formed therebetween and extending from the infeed end toward the discharge end of the packaging machine along the path of travel, spacing a pair of side guides equally apart from the longitudinal axis outside of the conveyor chains, moving the conveyor chains laterally toward and away from each other in response to the configuration, shape, and/or size of the articles of product moved along the path of travel, and simultaneously moving the side guides laterally toward and away from the conveyor chains as the conveyor chains are moved toward and away from each other.

The conveyor belt assembly of this invention includes at least one endless conveyor chain supported on the framework of the packaging machine and extending along or spaced from the path of travel, the chain of the chain conveyor having a plurality of pairs of links disposed adjacent one another, and a plurality of cross links, each pair of adjacent links being pivotally joined together by one of the cross links, and a plurality of modular snap-on table top lugs removably received on each one of the cross links along the length of the conveyor chain, the table top lugs forming a generally continuous horizontal transport surface along at least a portion of the length of the conveyor chain, and a drive assembly for moving the conveyor chain along the path of travel. Moreover, the novel conveyor chain of this apparatus is adapted for use with a spaced series of pop-up lug assemblies positioned along the length of the conveyor chain and moving therewith, the pop-up lug assemblies also forming a part of the transport surface of the conveyor chain, and thus the conveyor belt assembly, and which can be selectively moved into a raised position with respect to the transport surface thereof for varying the pitch of the lugs, and thus the flights formed along the length of the conveyor chain.

Thus, the combination of the unique components of this machine provides a novel and improved packaging machine having a variable pitch lugged conveyor belt assembly supported on the framework of the machine and extending along the path of travel, the conveyor belt assembly having a generally horizontal transport surface and including a spaced series of lugs along its length, each of the lugs being constructed and arranged for individual and reciprocal movement from a lowered position flush with respect to the transport surface into a raised position extending above the transport surface for forming variably pitched flights therebetween and along the length of the conveyor chain. A flighted side lug conveyor assembly is positioned downstream of the variable pitch lugged conveyor belt assembly, and is constructed and arranged to receive the groups of containers from the variable pitch lugged conveyor belt assembly for movement along the path of travel.

At least one modular tab folding assembly is positioned downstream of the side lug conveyor assembly, positioned adjacent the path of travel, and is constructed and arranged to fold the flaps of a prescored carton blank placed over the group of beverage containers toward the containers for locking the containers in position within the carton blank. The side lug conveyor assembly and the modular tab folding assembly are supported on a pair of accessory rails which are supported on the framework and spaced equally from the path of travel, each of the accessory rails including an elongated side guide mounted thereon along at least a portion of the length of, and adjacent the variable pitch lugged conveyor belt assembly for guiding the articles of product along the path of travel. The accessory rails are constructed and arranged for movement laterally toward and away from the path of travel. The variable pitch lugged conveyor belt assembly includes at least a pair of variable pitch lugged conveyor chains which are adapted to be laterally moved toward and away from each other so that the accessory rails are simultaneously moved laterally toward and away from the conveyor chains of the conveyor belt assembly as the conveyor chains are moved laterally toward and away from each other.

Thus, the method of packaging a spaced series of articles of product in this novel packaging machine include the steps of moving separate groups of containers along the path of travel with a variable pitch lugged conveyor belt assembly supported on the framework of the packaging machine toward a flighted side lug conveyor assembly positioned on the framework downstream thereof, providing a spaced series of lugs along the length of the conveyor belt assembly, positioning the lugs in either a lowered position flush with respect to the conveyor belt assembly or a raised position extending above the conveyor belt assembly for forming flights along the length thereof, and moving the groups of containers along the path of travel within the flights so formed toward the side lug conveyor, and from there downstream toward a modular tab folding assembly positioned on the framework adjacent the path of travel. This method also includes the steps of equally spacing a pair of accessory rails supported on the framework of the packaging machine from the path of travel, and providing a pair of side guides on each of the accessory rails, respectively. The side guides are spaced on opposite sides of the conveyor belt assembly and moved with the accessory rails laterally toward and away from the path of travel in response to the passage of groups of containers of differing sizes along the path of travel through the packaging machine.

DETAILED DESCRIPTION OF THE DRAWINGS

FIGS. 2A–2C are sequential partially cut-away side elevational views along the length of the packaging machine of FIG. 1.

FIGS. 3A–3C are sequential top plan views along the length of the packaging machine of FIG. 1.

Figure 1:
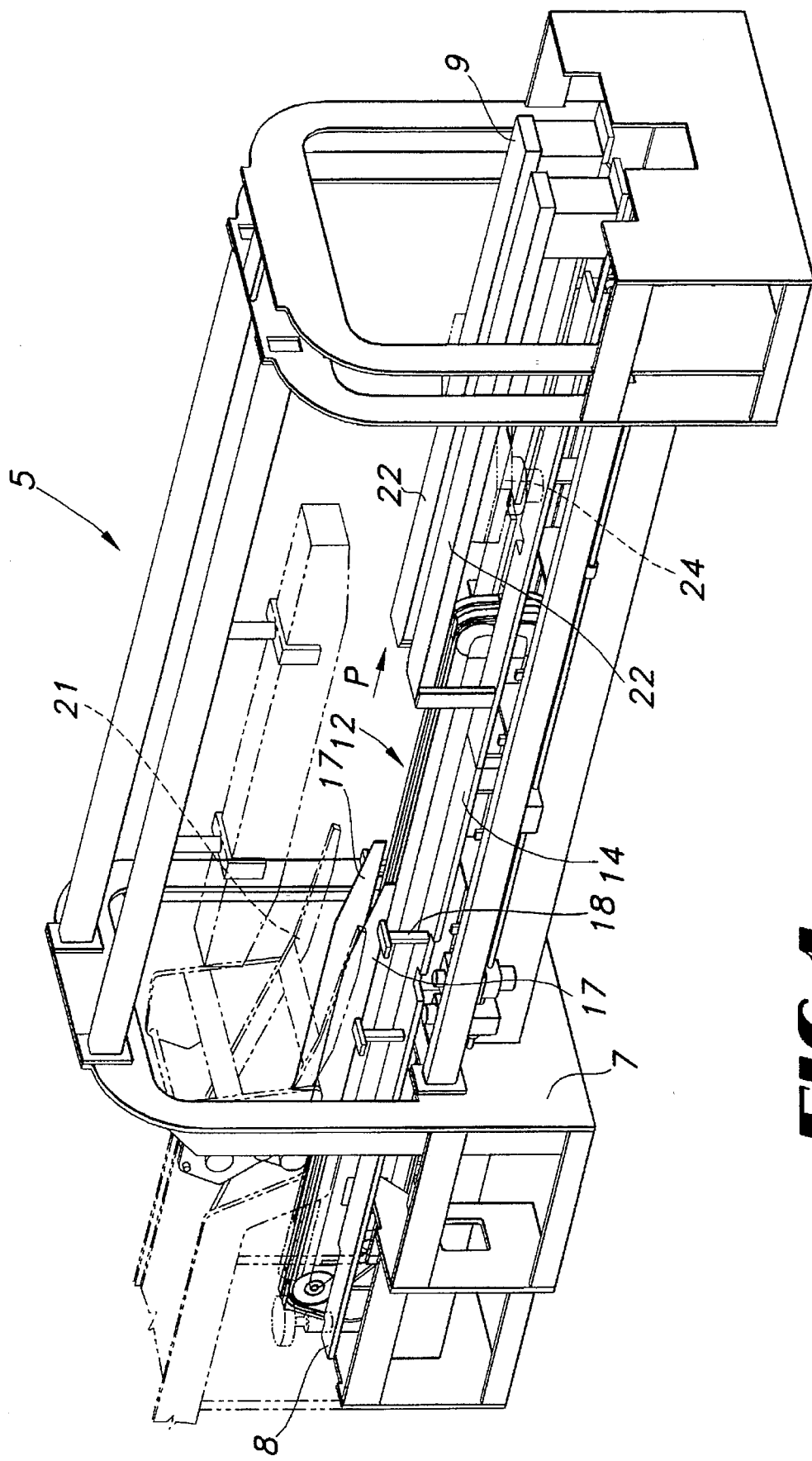
FIG. 1 is a perspective view of a preferred embodiment of the packaging machine.
Figure 4C:
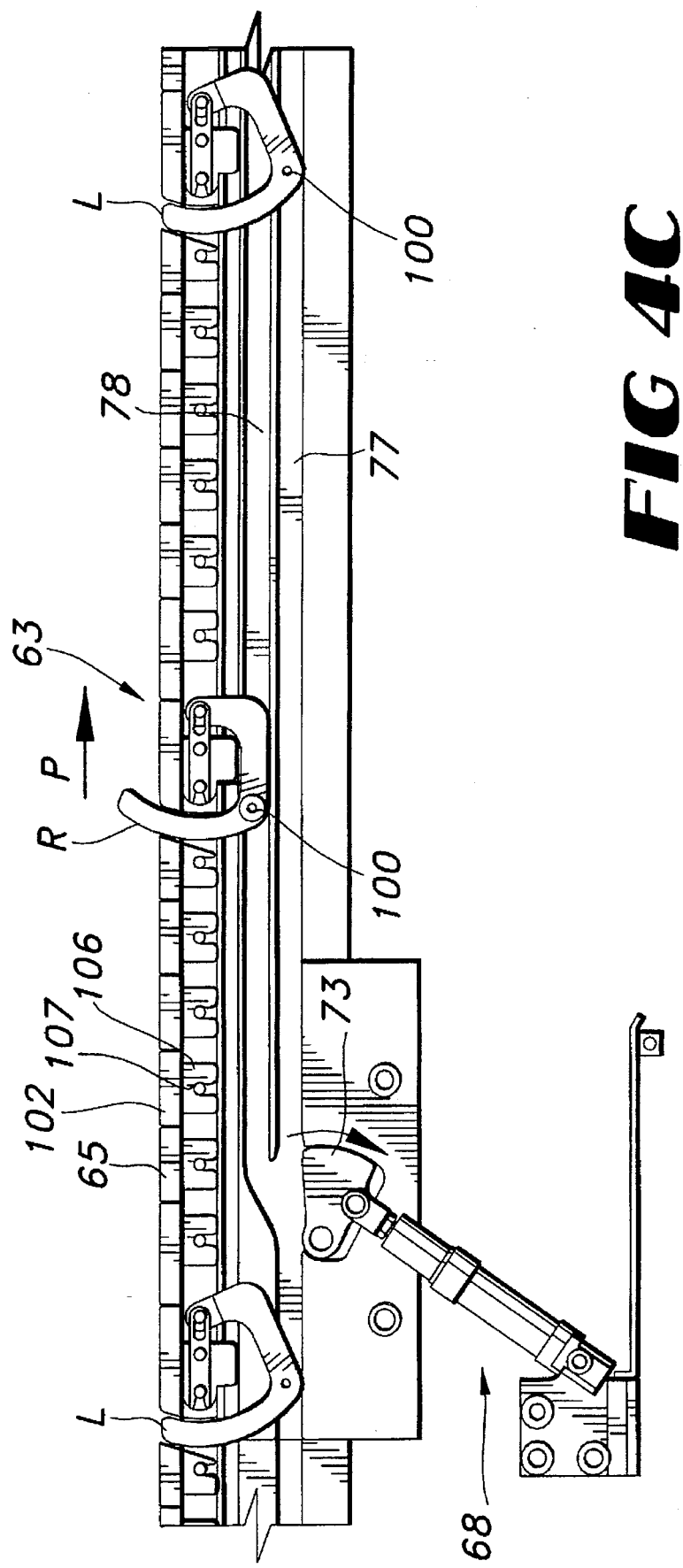

FIGS. 4A–4C sequentially illustrate the manner in which the variable pitch lugged conveyor belt assembly of the packaging machine of FIG. 1 is operated.

FIG. 5 is a partial top plan schematic view of a typical group of bottles being moved along the path of travel on the variable pitch lugged conveyor belt assembly of the packaging machine of FIG. 1.

FIG. 6 is a partial top plan schematic view of a group of larger bottles being moved along the path of travel on the variable pitch lugged conveyor belt assembly of the packaging machine of FIG. 1.

Figure 7:
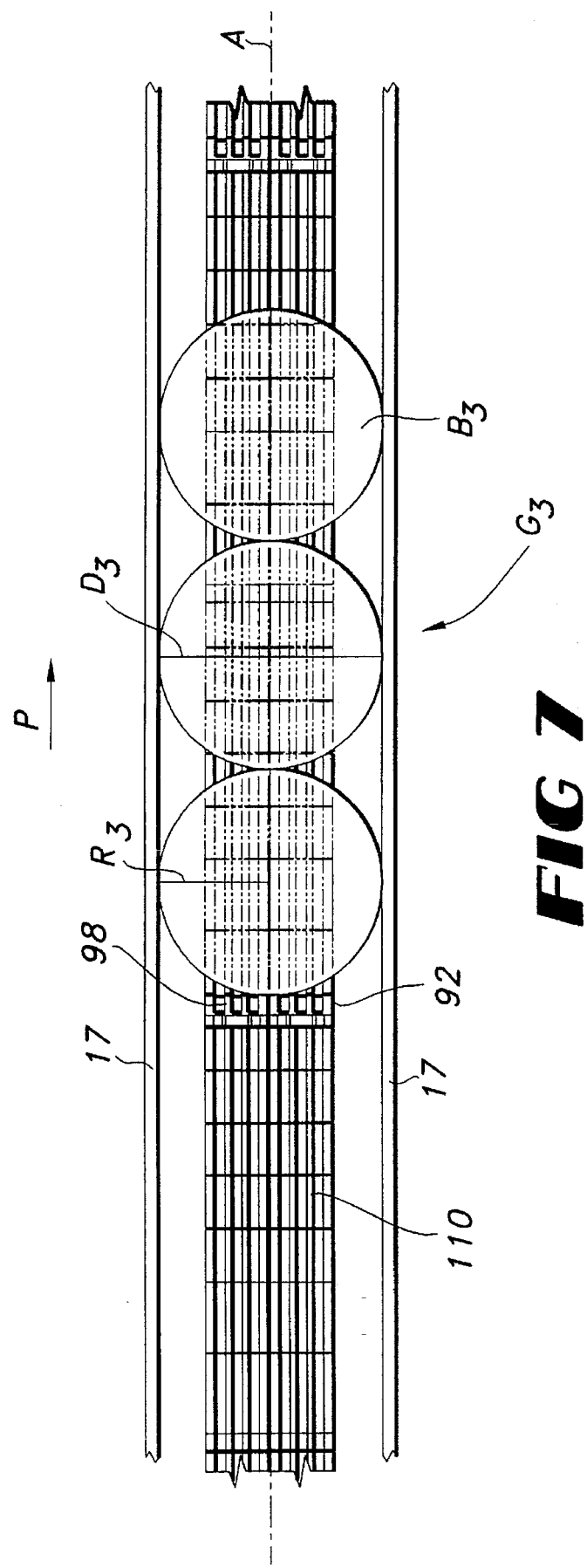

FIG. 7 is a partial top plan schematic view of a single file group of bottles being moved along the combined variable pitch lugged conveyor belt assemblies of the packaging machine of FIG. 1.

Figure 8:
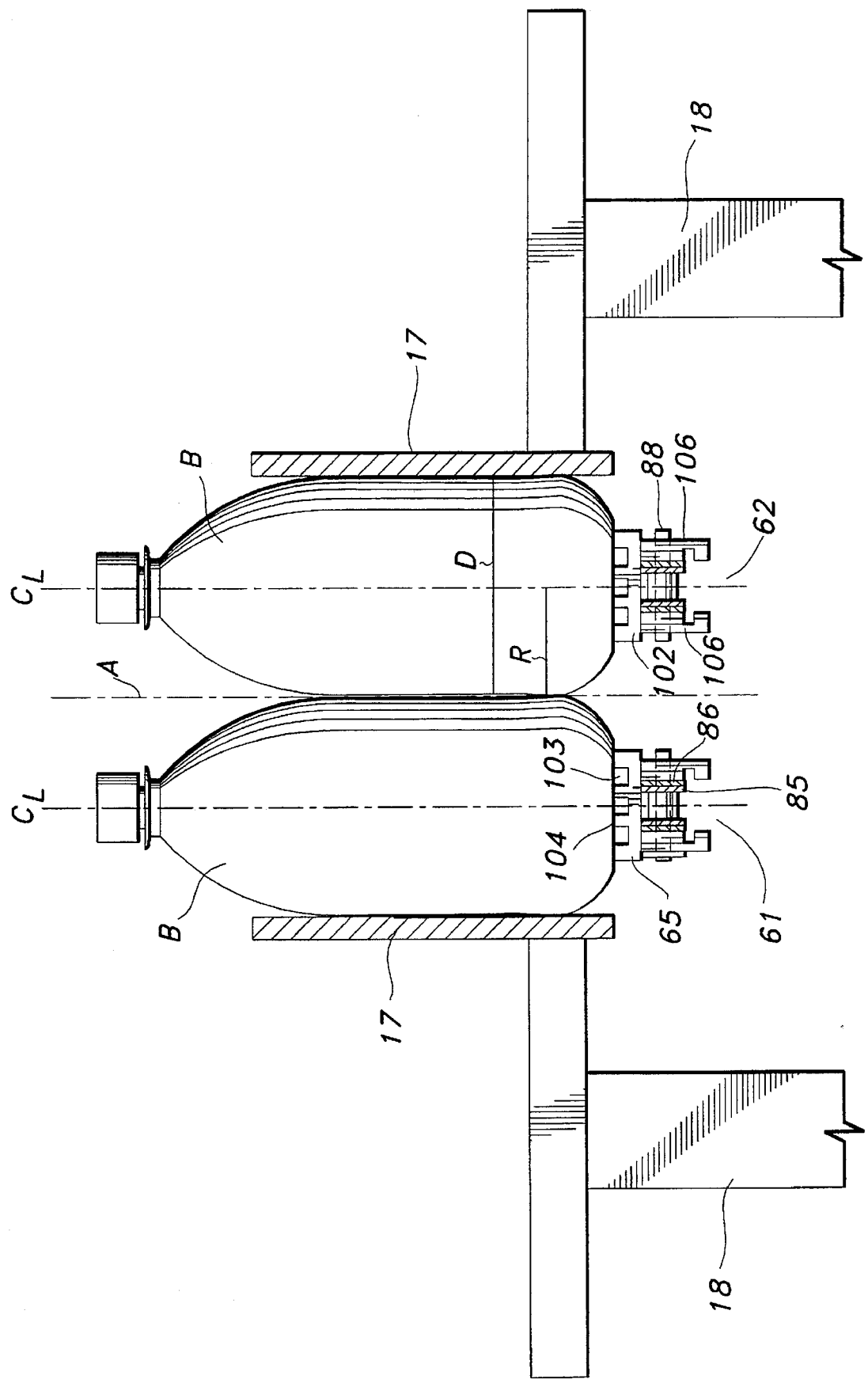

FIG. 8 is a partial cross-sectioned end elevational view along line 8—8 of FIG. 5.

Figure 9:
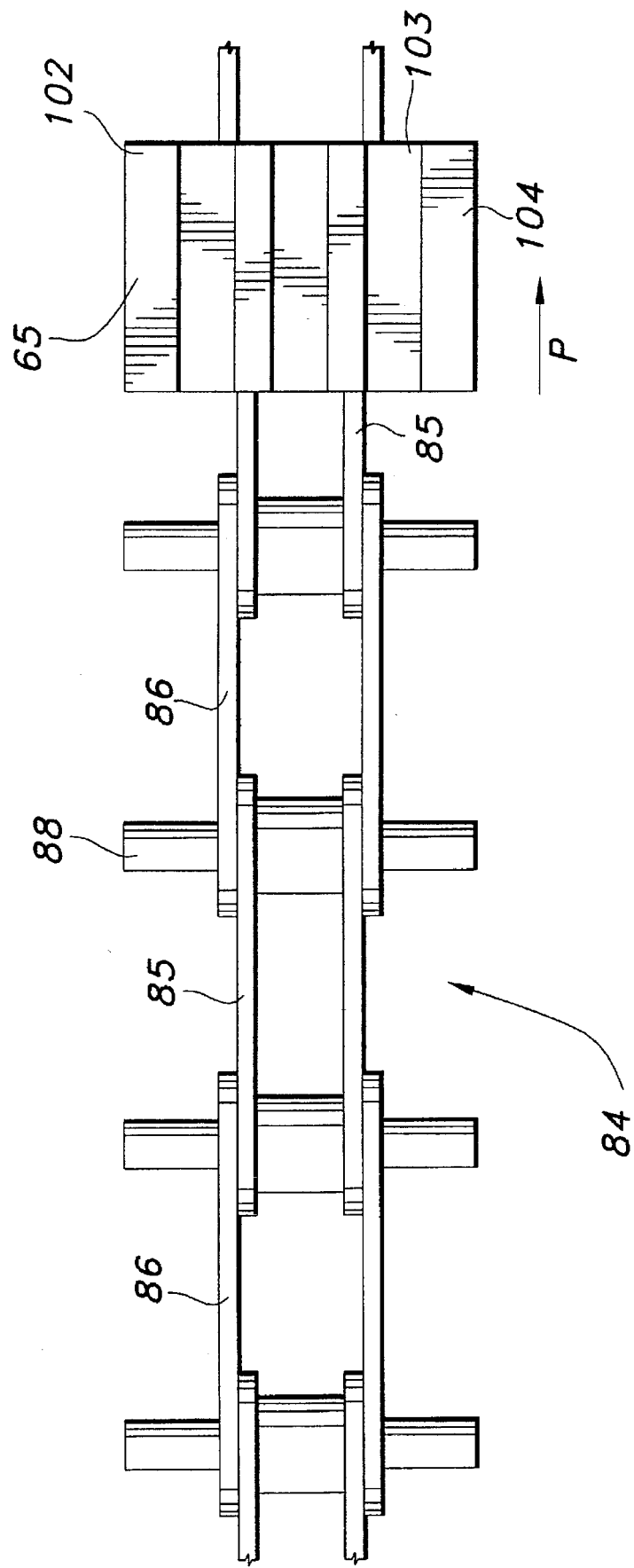

FIG. 9 is a partial top plan view of the chain conveyor of the packaging machine of FIG. 1.

Figure 10A:
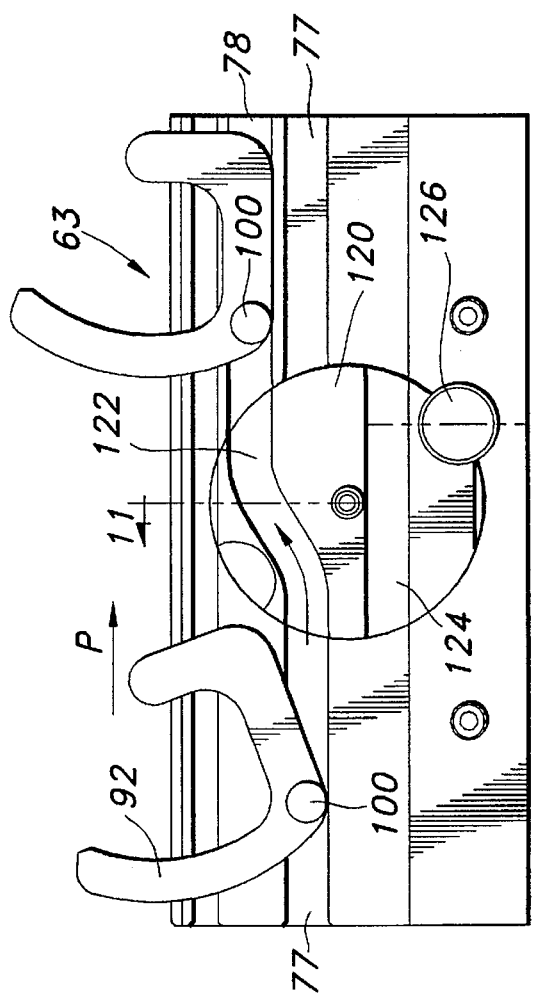
Figure 10B:
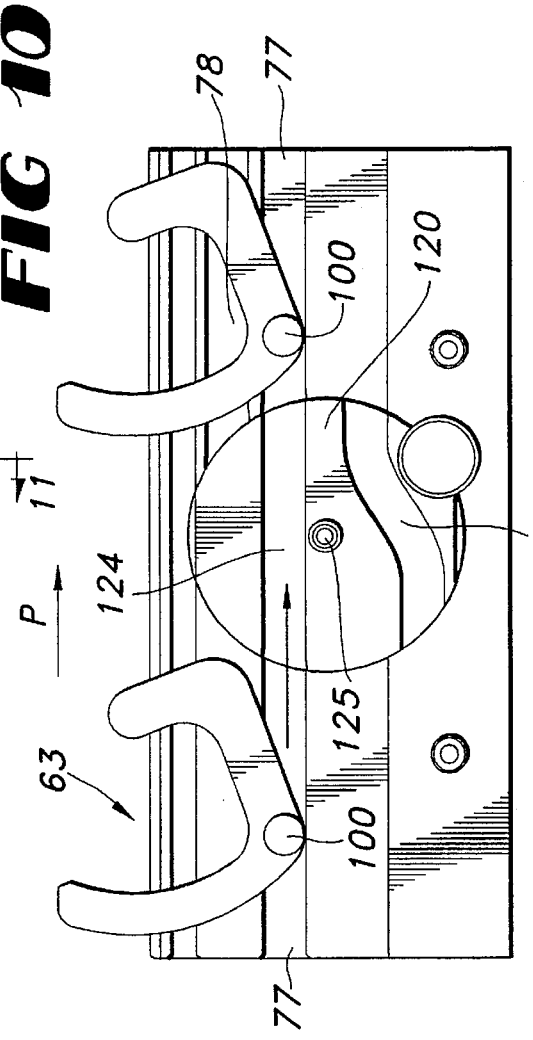

FIGS. 10A and 10B are sequential and partial side elevational views of a second apparatus and method for moving the pop-up lugs of the conveyor belt assembly into the raised position above the transport surface of the conveyor belt assembly.

Figure 11:
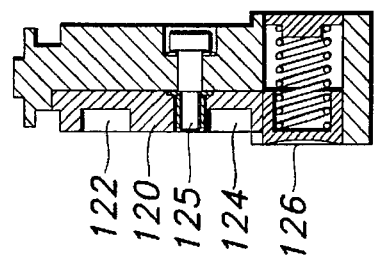

FIG. 11 is an end cross sectional view along line 11—11 of FIG. 10A.

Figure 12B:
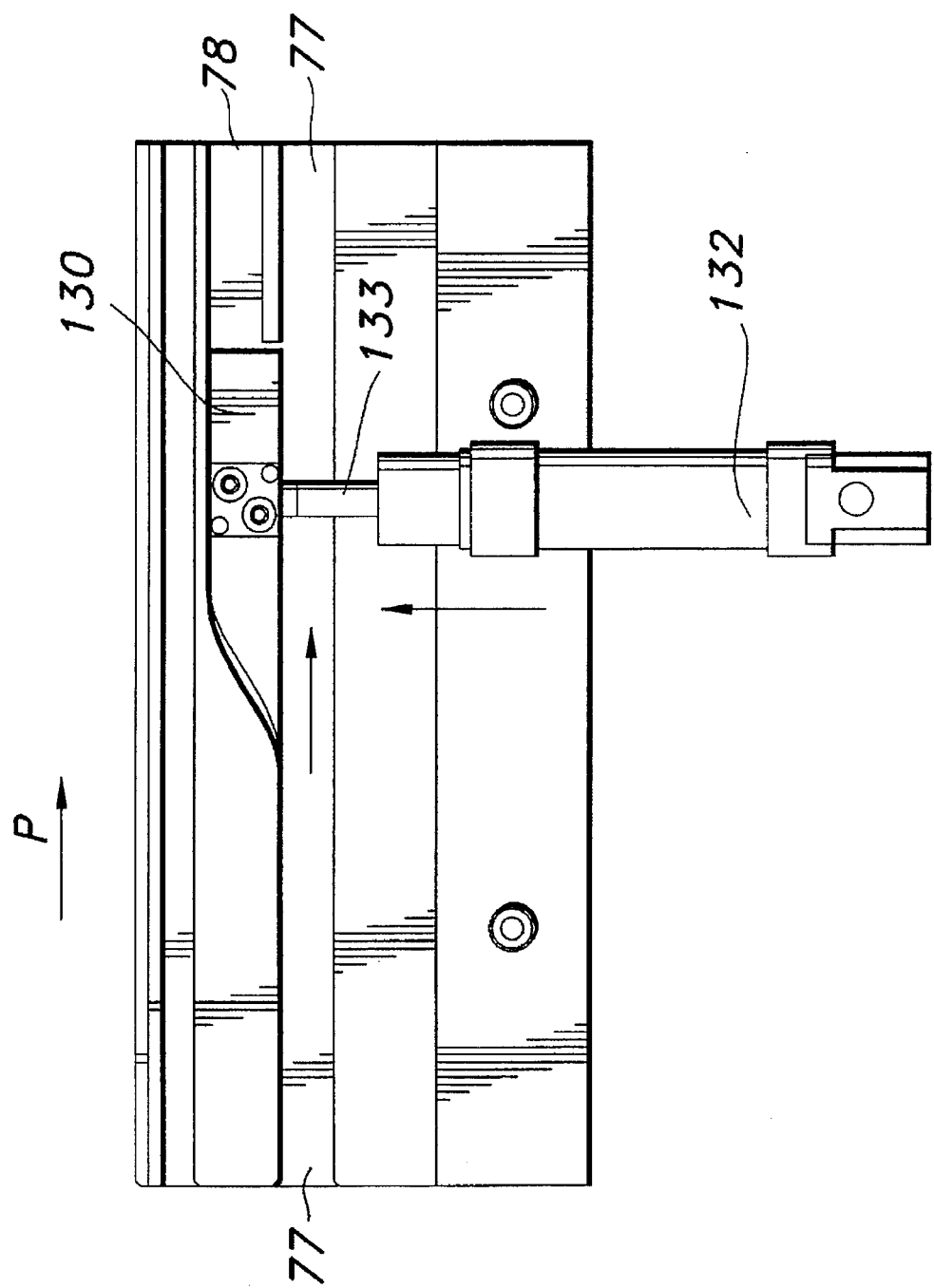

FIGS. 12A and 12B are sequential and partial side elevational schematic views of a third apparatus and method for moving the pop-up lugs of the conveyor belt assembly into the raised position above the transport surface of the conveyor belt assembly.

DETAILED DESCRIPTION OF THE PREFERRED EMBODIMENT

Referring now to the drawings, in which like reference characters indicate like parts throughout the several views, FIG. 1 is a perspective illustration of a preferred embodiment of the novel packaging machine of this invention.

Packaging machine 5 as shown in FIG. 1 is positioned along the path of travel "P" of a continuous motion beverage container packaging line. The packaging machine includes a structural metallic framework 7 having an infeed end 8 for receiving groups of bottles or other containers from the packaging line, and a spaced discharge end 9 for delivering packaged groups of bottles for further processing along the packaging line. It is understood by those skilled in the art that the packaging machine will receive phased or spaced groups of bottles at its infeed end 8. It is equally understood by those skilled in the art, although not illustrated here, that upstream of packaging machine 5 in the packaging line an untimed mass of beverage containers, i.e., bottles or cans, will be delivered on an untimed conveyor belt, for example a chain conveyor, to at least one star wheel apparatus for separating the untimed mass flow of containers into a generally aligned and spaced lane or lanes of containers, then passed to a selector screw, which is a helical screw constructed and arranged to space or phase the containers into separate groups with respect to each group of containers so formed, whereupon the spaced or phased groups of containers are delivered to infeed end 8 of packaging machine 5.

Thus, and still referring to FIG. 1, packaging machine 5 extends along a portion of path of travel P along which the containers are moved for packaging. Immediately downstream of infeed end 8 is a variable pitch lugged conveyor belt assembly 12. Also extending along the path of travel is a pair of accessory rails 14, best shown in FIGS. 3A through 3C, each of which is supported on framework 7 by a plurality of accessory rail brackets 15, the accessory rail brackets forming a part of the drive system, discussed in greater detail below, constructed and arranged for moving the accessory rails laterally toward and away from the path of travel. As shown in FIGS. 3A through 3C, each accessory rail 14 extends along the opposite sides of conveyor belt assembly 12, from infeed end 8 toward discharge end 9 on framework 7.

Mounted on each one of accessory rails 14 is a side guide 17, supported thereon by a plurality of side guide brackets 18. In this instance, three side guide brackets 18 are provided for each one of side guides 17, best shown in FIGS. 3A and 3B. Side guides 17 are permanently affixed to side guide brackets 18, side guide brackets 18 each having a first portion (not illustrated) in which an elongated slot 18 (not illustrated) is defined therein through which a fastener (not illustrated) is passed into a second portion (not illustrated) secured to the accessory rail for positioning side guides 17 with respect to the path of travel P along conveyor belt assembly 12. It is anticipated that each of side guides 17 will be spaced equally from longitudinal axis A of the packaging machine, again best shown in FIGS. 3A and 3B.

The top plan view of side guides 17, and of the conveyor belt assembly 12, in FIGS. 3A and 3B shows the conveyor belt assembly and side guides in two different positions for the purpose of illustrating how the side guides may be moved with respect to conveyor chains 61 and 62 of conveyor belt assembly 12, described in greater detail below. Each side guide 17 faces outwardly of an external edge 19 formed along each of conveyor chains 61 and 62 of conveyor belt assembly 12, as best shown in FIGS. 3A and 3B.

Referring now to FIG. 2A, packaging machine 5 includes a conveyor chain tensioning assembly 20 supported on framework 7, the conveyor chain tensioning assembly being constructed to tension the chain 84 (FIG. 9) of each of conveyor chains 61 and 62 of conveyor belt assembly 12. Conveyor chain tensioning assembly 20 is fully disclosed in a separate U.S. Patent Application entitled Conveyor Tensioning Assembly, Ser. No. 08/576,074, filed on Dec. 21, 1995, and incorporated by reference as if set forth fully herein.

Referring now to FIG. 1, packaging machine 5 also includes a carton blank station 21 positioned generally above conveyor belt assembly 12, the carton blank station being constructed and arranged to move carton blanks (not illustrated) downwardly over each group G of bottles B, the groups of bottles being schematically illustrated in FIGS. 5 through 7, as each group of bottles progresses along the path of travel on the conveyor belt assembly. Described in greater detail below, conveyor belt assembly 12 is a variable pitch flighted conveyor belt, here a chain conveyor, which spaces each group of containers along the path of travel, so that the packaging operations performed on the groups of containers on packaging machine 5 can be done in sequence, i.e., in a proper timed relationship with respect to each other. Thus, as each group of bottles G, shown schematically in FIGS. 5 through 7, is being moved along the path of travel, a carton blank (not illustrated) is simultaneously placed downwardly over the group of bottles at carton blank station 21.

After leaving carton blank station 21, and after being moved along the path of travel by conveyor belt assembly 12, each group of containers is placed on a stationary dead plate (not illustrated) of the type conventionally known in the art and positioned along the path of travel. The groups of containers are moved on the dead plate down the path of travel by a pair of side lugged conveyor belt assemblies 22 constructed to move each group of bottles toward a pair of modular tab folding assemblies 24, best shown in FIG. 3C, which act to fold the flaps or tabs (not illustrated) of each carton blank (not illustrated) inwardly toward each group of bottles for securing the bottles in position within the carton blank once it is sealed in position around the group of bottles. Modular tab folding assembly 24 is fully disclosed in a separate U.S. patent application Ser. No. 08/549,988, U.S. Pat. No. 5,592,804, entitled Method and Apparatus for Positioning Carton Flaps, Mr. Urs Reuteler, inventor, and incorporated by reference as if set forth fully herein.

It is understood by those skilled in the art that once each group of bottles G leaves modular tab folding assemblies 24, they are passed downstream along the path of travel on packaging machine 5 toward a carton sealing station (not illustrated) which will take the bottom sealing or locking tabs (not illustrated) of the carton blank (not illustrated), and seal or close the locking tabs and thus the carton blank, about the group of bottles. The group of bottles is then moved toward discharge end 9 and away from packaging machine 5.

The structure of packaging machine 5 is shown in greater detail in FIGS. 2A through 2C, and in FIGS. 3A through 3C, each of which is a sequential view along the side elevation, or top plan, respectively, of the packaging machine.

Referring first to FIGS. 2A through 2C, a drive motor 26 (FIG. 2B) is supported on framework 7, drive motor 26 having a toothed drive gear (not illustrated) engaged on a toothed drive belt 27, which is received on a toothed drive pulley (not illustrated) of drive shaft gear box 28. Drive shaft gear box 28 transmits the rotational power of drive motor 26 to a first drive shaft 30 which extends along one side and the length of packaging machine 5. Drive shaft gear box 28 also rotates a cross drive shaft 31 (FIG. 3A), which in turn rotates a second generally parallel drive shaft 34 which extends along the opposite side of packaging machine 5, best shown in FIGS. 3A through 3C. Each of drive shafts 30 and 34 may be a continuous drive shaft, if so desired. However, it is anticipated that each of drive shafts 30 and 34 will be comprised of several drive shaft portions, each adjacent drive shaft portion being connected by a drive shaft coupling 35 as shown in FIGS. 2A, 2C, 3A, and 3C.

Each of drive shafts 30 and 34 drives three pairs of accessory rail gear boxes positioned on opposite sides, and along the length, of packaging machine 5. The first pair of accessory rail gear boxes 37 is shown in FIGS. 2A and 3A, the second pair of accessory rail gear boxes 38 is shown in FIGS. 2B and 3B, and the third pair of accessory rail gear boxes 39 is shown in FIGS. 2C and 3C, respectively. Each one of accessory rail gear boxes 37, 38, and 39 is supported on framework 7 and has a threaded shaft 44 which extends in a generally perpendicular direction with respect to drive shafts 30 and 34, respectively, toward path of travel P. Each threaded shaft 44 is passed through one of accessory rail brackets 15, best shown in FIGS. 3A through 3C, and into a threaded nut 45 mounted on each one of accessory rail brackets 15. Accordingly, each accessory rail 14 is supported on three accessory rail brackets 15, each accessory rail bracket being movably supported on threaded shafts 44 of accessory rail gear boxes 37 through 39, respectively. So constructed, each accessory rail 14, and thus each side guide 17, is constructed to be moved laterally toward and away from the path of travel. The rate of movement will depend upon the gear box ratio selected for accessory rail gear boxes 37, 38, and 39, each of which is geared identically, as well as the speed with which drive shafts 30 and 34 are driven by drive motor 26 through drive shaft gear box 28.

Drive shafts 30 and 34 also transmit power to two pairs of conveyor chain assembly gear boxes 41 and 42, geared identically and positioned on opposite sides of and along the length of conveyor belt assembly 12, as best shown in FIGS. 2A, 2B, 3A, and 3B. Referring now to FIGS. 3A and 3B, a first pair of conveyor belt assembly gear boxes 41 is supported on framework 7 adjacent the first pair of accessory rail gear boxes 37, while the second pair of conveyor belt assembly gear boxes 42 is positioned adjacent the second pair of accessory rail gear boxes 38 on framework 7. Conveyor belt assembly gear boxes 41 and 42 are driven in common with accessory rail gear boxes 37 through 39 by drive shafts 30 and 34, respectively. Each of conveyor belt assembly gear boxes 41 and 42 is constructed to move first conveyor chain 61 and second conveyor chain 62 laterally toward and away from each other along longitudinal axis A of the packaging machine. Unlike accessory rails 14 and side guides 17 positioned thereon, conveyors chains 61 and 62 can be moved adjacent one another along axis A of the packaging machine, as illustrated generally in FIG. 7, if so desired. This is accomplished through the use of spring tension drive assemblies 47, one spring tension drive assembly being provided for each one of conveyor belt assembly gear boxes 41 and 42, for a total of four spring tension drive assemblies, as best shown in FIGS. 3A and 3B.

Referring now to FIGS. 3A and 3B, each spring tension drive assembly 47 includes a threaded shaft 48, which extends from conveyor belt assembly gear boxes 41 and 42, respectively, generally perpendicularly from drive shafts 30 and 34 toward path of travel P. Each threaded shaft 48 is received within a threaded nut 49 held within a housing 50, housing 50 being supported on conveyor assembly 12, so that the nut may move in a linear direction toward and away from the path of travel, nuts 49 being fixed so that they will not rotate with the rotation of each of threaded shafts 48. Positioned within housing 50 adjacent nut 49 is a stop spring 51 biased against nut 49, so that nut 49 is held away from path of travel P. However, and as described in greater detail below, when conveyor chains 61 and 62, as well as accessory rails 14, are moved toward path of travel P to drive conveyor chains 61 and 62 adjacent one another for forming a single conveyor chain 110 (FIG. 7), each of nuts 49 will be urged against stop spring 51 toward the path of travel once conveyor chains 61 and 62 are adjacent one another to allow accessory rails 14, and thus side guides 17, to be moved toward the external edges 19 of conveyor chains 61 and 62 for guiding the groups G of bottles B along path of travel P (FIG. 7) without locking up the drive assembly. Spring tension drive assemblies 47 thus allow the side guides to continue an inward adjustment toward axis A even after conveyor chains 61 and 62 have moved adjacent one another forming a single conveyor chain 110 for single lane product flow along the path of travel. Again, and as with accessory rails 14, the speed at which each of conveyor chains 61 and 62 is moved toward each other is dependent upon the gear box ratios specified for conveyor belt assembly gear boxes 41 and 42, as well as the speed of shafts 30 and 34. It is anticipated that each accessory rail gear box will be geared to operate twice as fast as the gear boxes for chain conveyors 61 and 62.

So constructed, the unique feature of packaging machine 5 is its ability to automatically adjust for groups of containers, in this instance, bottles or cans, of varying size without the need to stop production or to physically release, move, and reposition any side guides or conveyor chains formed as a part of the packaging machine, thus greatly enhancing the flexibility, efficiency, and performance of packaging machine 5 in high speed, high volume packaging operations.

Referring now to FIGS. 5 through 7, the manner in which conveyor belt assembly 12 automatically adjusts to groups of containers of differing sizes is discussed. Referring first to FIG. 5, packaging machine 5 is shown in a partial schematic top plan view moving a group G of bottles B along path of travel P. This group G of bottles is a typical group of bottles, having six bottles formed in two rows of three apiece which form a beverage six-pack. The manner in which the packaging machine operates will be generally the same for either beverage cans or bottles.

Each one of conveyor chains 61 and 62 has a centerline designated by the notation "$C_L$" extending along the length thereof, and spaced equidistant from axis A along path of travel P. Each one of bottles B is centered on centerline $C_L$ of conveyor chains 61 and 62, respectively, so that the distance between the centerline of each conveyor chain and the longitudinal axis A of the machine is equal to $R_1$, the radius of each container in the group of containers. Similarly, the distance between the longitudinal axis A and the tangential edge of side guide 17 necessary to guide group G of bottles B along the path of travel is equal to $D_1$, the diameter of each container. Accordingly, each side guide 17 is spaced twice as far from axis A as is the centerline of each conveyor chain 61 and 62. This is made possible by using different gear box ratios, here a 2:1 ratio, for the accessory rail gear boxes 37–39 to the conveyor belt assembly gear boxes 41 and 42, so that side guides 17, and thus accessory rails 14, are moved laterally toward and away from axis A at twice the relative rate of speed compared to that rate of speed, i.e., lateral movement, of conveyor chains 61 and 62 toward and away from each other and/or axis A.

The distance between the side guides is indicated by the notation "W" which is equal to two times the diameter of each bottle B of the group of bottles, or two times $D_1$. The group of bottles on conveyor chains 61 and 62 in FIG. 5 is held in position on the conveyor chains by a variable pitch pop-up lug 92 of pop-up lug assemblies 63 (FIGS. 4A through 4C), the operation of which is discussed in greater detail below.

Referring now to FIG. 6, conveyor belt assembly 12 is shown at its maximum width, designated by the notation "$M_x$" between side guides 17, for a group $G_2$ of bottles $B_2$. Each bottle $B_2$ has a greater radius, thus diameter, of bottles B for the first group of bottles shown in FIG. 5. It is anticipated that width W (FIG. 5) between side guide 17 will be adjustable through a range of approximately 100 mm. to over 200 mm., based on the diameters of the containers being moved along path of travel P, either in two rows as shown in FIGS. 5 and 6, or in a single file row of containers as shown in FIG. 7. The width of conveyor chains 61 and 62, however, does not vary, but stays fixed as shown, only the distance between the conveyor chains varies as the chains are laterally moved toward and away from each other to accommodate beverage containers of varying sizes. Generally the two conveyor chains 61 and 62 are spaced from each other, the only instance in which the conveyor chains are not spaced from one another being when the two conveyor chains are moved adjacent one another to form a single conveyor chain 110 as shown in FIG. 7, single conveyor chain 110 being particularly well suited for moving bottles of a smaller product diameter along path of travel P.

Otherwise, each of conveyor chains 61 and 62 will be equally spaced from axis A along path of travel P.

Still referring to FIG. 6, as each of bottles $B_2$ in group $G_2$ is larger than bottles B in group G of FIG. 5, side guides 17 have been moved from longitudinal axis A along path of travel P a distance equal to $D_2$, the diameter of bottle $B_2$, whereas each conveyor chain 61 and 62 has been moved so that its centerline $C_L$ is at distance $R_2$, equal to the radius of each bottle, from longitudinal axis A. The ratio of $R_2$ to $D_2$ is one to two, as is the ratio of $R_1$ to $D_1$, thus side guides 17, and accordingly accessory rails 14, move twice as fast as do conveyor chains 61 and 62 as each is being moved toward and away from longitudinal axis A along the path of travel, respectively.

Thus, due to the unique construction of packaging machine 5, as illustrated in FIGS. 2A, 2B, 3A, and 3B, first conveyor chain 61 and second conveyor chain 62 are constructed to be moved laterally toward and away from each other in a common horizontal plane (FIG. 8), while each side guide 17 is simultaneously moved laterally toward and away from conveyor chains 61 and 62, respectively, at a ratio of one to two, equal to the radius of the container transported on the conveyor chain to the diameter of the container being transported on the conveyor chain. Accessory rails 14 and conveyor chains 61 and 62 may thus be driven through an infinite number of widths W between side guide 17, within the physical constraints of the machine, as discussed generally above.

Through the use of modern machine controls (not illustrated) and data processing equipment (not illustrated), a series of pre-programmed container sizes and group sizes can be input into the packaging machine for automatically moving conveyor chains 61 and 62, and accessory rails 14, toward and away from each other, respectively, based on the sizes of the containers within each group of containers, e.g., bottles or cans, being moved along the path of travel. It is anticipated, in line with current production practices, that a series of groups of containers, all of approximately the same size, will be processed at one time, and that the size of each group of containers in series being processed along packaging machine 5 will not vary from group to group in the same spaced series of bottles or cans. So constructed, packaging machine 5 is readily adaptable, versatile, and can quickly be changed over to any size bottle group or container size being processed along packaging machine 5, again subject to the physical constraints of the packaging machine, i.e., how far side guides 17 can be moved apart from or toward one another, as shown in FIGS. 5 through 7.

Referring now to FIG. 7, conveyors chains 61 and 62 are shown having been moved adjacent one another along axis A to form a single conveyor chain 110, being of a size large enough to handle a group $G_3$ of bottles 133 larger than either group G or group $G_1$, in FIGS. 5 and 6, respectively. For example, bottles $B_3$ could be two liter soft drink bottles, or other similarly shaped and sized beverage containers. However, conveyor chain 110 as illustrated in FIG. 7 is also well suited for the movement of beverage containers of the smallest container size as chain conveyors 61 and 62 are moved together to form a transport surface stable enough to handle small diameter product/beverage containers. As conveyor chains 61 and 62 have been moved adjacent one another to form conveyor chain 110, a larger transport surface is provided and thus larger, or smaller, bottles can be easily handled. However, and unlike FIGS. 5 and 6, here the distance between longitudinal axis A to each of side guides 17 is equal to the radius $R_3$ of each bottle $B_3$, rather than its diameter, the total distance between side guides 17 being equal to the diameter $D_3$ of each bottle $B_3$.

Thus, the one to two ratio of movement of the conveyor chains 61 and 62 with respect to side guides 17 is changed, which change is accommodated by the use of spring tension drive assemblies 47. As each of conveyor chains 61 and 62 is moved toward and ultimately adjacent each other along axis A, each threaded shaft 48 within conveyor belt assembly gear boxes 41 and 42 moves nut 49, and thus housing 50, toward path of travel P, i.e., longitudinal axis A. However, as conveyor chains 61 and 62 will ultimately be moved adjacent each other and abut one another, conveyor chains 61 and 62 will thus not be able to move any further toward each other, at which point in time is nut 49 is urged against stop spring 51 within housing 50 so that the drive system for the packaging machine, i.e., drive motor 26, drive shafts 30 and 34, accessory rail gear boxes 37 through 39, and conveyor gear belt assembly boxes 41 and 42, will not bind as the conveyor chains are pressed against one another and no longer have the ability to be moved laterally toward axis A. Thus, once each nut 49 abuts stop spring 51 and begins moving inward on the spring, each of accessory rail gear boxes 37 through 39 continues to rotate, driving threaded shafts 44 within nuts 45, each nut 45 being mounted to an accessory rail bracket 15, for moving accessory rails 14, and thus side guides 17, toward longitudinal axis A. Again, and as with the operation of the packaging machine as shown in FIGS. 5 and 6, a series of preprogrammed data can be entered into conventional control apparatus or computer (not illustrated) used with packaging machine 5 to automatically adjust conveyor chains 61 and 62, side guides 17, and accessory rails 14, for the sizes of the containers, or groups of containers, being processed on the packaging machine.

Referring now to FIGS. 2A through 2C and 3A through 3 C, in particular FIGS. 2B and 3B, conveyor belt assembly 12 includes a first conveyor chain 61 and a second generally parallel conveyor chain 62, each being driven by conveyor belt assembly drive motor 52 positioned on framework 7, driving a gear box 53 having a toothed drive gear (not illustrated) received on a toothed drive belt 54, the drive belt being received on a toothed pulley (not illustrated) of a drive sprocket 55 for moving each of conveyor chains 61 and 62 from the infeed end 8 toward the discharge end 9 of the packaging machine along the path of travel P. Each conveyor chain 61 and 62 is supported on packaging machine 5 by a separate drive sprocket 55, and three idler sprockets 57 as shown in FIGS. 2A and 2B. Although only conveyor chain 62 is shown in FIGS. 2A and 2B, conveyor chain 61 is a mirror image of conveyor chain 62. Each conveyor chain is driven by a separate drive sprocket 55, which receives power from the shaft on which the toothed pulley (not illustrated) driven by drive belt 54 is positioned.

Referring now to FIGS. 2A and 2B, the variable pitch lugged conveyor belt/chain feature of the packaging machine is illustrated in greater detail. Each of conveyor chains 61 and 62 has a series of pop-up lug assemblies 63 spaced along the length of the conveyor chain. Extending along the conveyor chains, intermediate each pop-up lug assemblies 63, is a plurality of modular table-top lugs 65, illustrated in greater detail in FIGS. 8 and 9, which are removably received by being snapped onto each chain 84 (FIG. 9) respectively, separate chains 84 form a part of each of conveyor chains 61 and 62. Pop-up lug assemblies 63, in conjunction with modular table-top lug 65, form a generally horizontal and continuous transport surface 66 along the length of the conveyor belt assembly. As shown in FIGS. 2A and 2B, the pop-up lug assemblies travel along the path of travel until they reach an actuating assembly 68, whereupon the pop-up lug assemblies can be moved into a raised position extending above the transport surface of the conveyor chain, designated by the notation "R", or left flush in a lowered position, designed by the notation "L", with respect to the transport surface as the pop-up lug assemblies move with the conveyor chain along the path of travel.

Referring now to FIGS. 4A through 4C, the variable pitch feature of conveyor belt assembly 12 is discussed in greater detail.

In FIG. 4A actuating assembly 68 is shown positioned on packaging machine 5 with respect to conveyor chain 62. Actuating assembly 68 includes a double action cylinder 69 having a first end 70 pivotally supported on the packaging machine, and a second end 71 pivotally supported on a cam 73. Cam 73 itself has a first end 74, pivoting about a fixed point on the packaging machine with respect to a first or lower cam track 77 and a second or upper cam track 78 for the lower and raised positions of each pop-up lug assembly, respectively. Cam 73 has a second end 75 which is free to move reciprocally upward and downward as shown by the arrows in FIGS. 4A and 4C. Second end 71 of cylinder 69 is connected intermediate first end 74 and second end 75 of cam 73 to impart a lever action to the cam. Cam 73 is shaped for guiding the pop-up lug assemblies into the raised position, indicated by the notation "R" (FIG. 4B), when so desired.

As shown in FIGS. 2A and 2B, first cam track 77 extends along the length of conveyor chains 61 and 62, and below transport surface 66 of each conveyor chain. Second cam track 78, however, extends along only a portion of the length of first cam track 77, and does not extend along the entire length of the conveyor belt assembly.

It is not until the beverage containers have been grouped on conveyor belt assembly 12 that the containers need to be moved along the path of travel positioned with respect to each other in flights, i.e., by being phased or spaced at a certain distance from each other, so that groups of bottles are moved in timed relationship through carton blank station 21 toward side lug conveyor belt assembly 22, and from there to modular tab folding assembly 24 for packaging each group of bottles within a carton blank (not illustrated).

As discussed above, flighted conveyors using fixed timing lugs or pins are known, the limitation of these conveyor belts being that the pitch of the flights, the distance between the front of one lug to the front of the next lug, is fixed so that the pitch or distance between flights cannot be changed for groups of containers of varying sizes. As shown schematically in FIGS. 4A through 4C, however, each of pop-up lug assemblies 63 can be individually selected for movement into the raised position R from the lowered position L dependent on the needs of the packaging machine, and as determined by the timing requirements of the groups of containers being moved along the path of travel. By using pop-up lug assemblies, the amount of dead space, i.e., space which is taken up by the pop-up lug when it is in the raised position, is reduced which allows either for a higher product throughput for a given conveyor speed, or a lower conveyor speed for a given product throughput based on production needs or requirements.

Referring now to FIG. 4A, each pop-up lug assembly 63 includes a leading lug 90, a filler lug 91, a pop-up lug 92, and a trailing lug 93. Modular table-top lugs 65 extend along conveyor chain 61, or 62, from each trailing lug to each leading lug of successive pop-up lug assemblies along the length of the conveyor chain, thus creating the generally continuous and horizontal transport surface 66 of the conveyor chain. Each pop-up lug 92 has a pair of parallel first portions 95 pivotally supported on chain 84 (FIGS. 8, 9) and extending on both sides of the conveyor chain. A pair of generally parallel second portions 96 extend perpendicularly from the ends of first portions 95, and generally parallel to transport surface 66 of the conveyor chains. An arcuate portion 97 is formed at the end of each second portion 96, arcuate portions 97 being generally parallel to one another and extending upward between filler lug and trailing lug 93 to form a portion of transport surface 66 with cap piece 98 positioned across the ends of arcuate portions 97. A cam follower 100 is provided on at least one of arcuate portions 97, and faces inward into first cam track 77, or second cam track 78, if the pop-up lug 92 has been moved into its lowered or raised position, respectively.

Each of pop-up lug assemblies 63 is assembled from the described components as a modular assembly. It is anticipated that the height of pop-up lug 92 above transport surface 66 of conveyor chains 61 and 62 can be varied by constructing pop-up lug 92, and thus each pop-up lug assembly 63, to have a greater length along second portion 96 and/or along arcuate portion 97 of lug 92 so that pop-up lug 92 moves through a greater radius, and/or merely extends to a greater degree above transport surface 66 upward through filler lug 91 and trailing lug 93. This change can be accommodated not only by changing the dimensions of pop-up lug 92, but by also changing the length of filler lug 91, as needed, based on the changes in lug 92.

Referring once again to FIGS. 4A through 4C, the sequence in which a pop-up lug assembly 63 is selected for movement into the raised position is illustrated. In FIG. 4A, pop-up lug assembly 63 is moving along path of travel P in first cam track 77 toward cam 73. As this pop-up lug assembly has been chosen for movement into the raised position, cylinder 69 is actuated to move cam 73 upward, pivoting about its first end 74, so that cam follower 100 is moved from first cam track 77 along cam 73 toward and into second cam track 78. As the cam follower 100 moves along cam 73 into second cam track 78, arcuate portion 97 of pop-up lug 92 moves upward between filler lug 91 and trailing lug 93, so that cap piece 98 (FIGS. 3A, 3B, 5 through 7) is moved upward to push against a group of bottles or containers positioned on the transport surface of the conveyor chain.

Thus, in FIG. 4B, cam 73 is shown in its uppermost position, having directed cam follower 100 into second cam track 78. Double action cylinder 68 may be either a hydraulic cylinder or a pneumatic cylinder. It is intended here that cylinder 68 is a pneumatic cylinder. Alternate means of guiding cam follower 100 from first cam track 77 into second cam track 78 do exist. For example, cam 73 could be positioned at the end of a servomotor driven in relation to signals received by an encoder, i.e., either a feedback device on conveyor belt assembly drive motor 52, or from a sprocket driven by conveyor chains 61 and/or 62, respectively, so that as pop-up lug assembly 63 approaches cam 73, the servomotor will be powered so that the cam is rotated for urging cam follower 100 into second cam track 78.

As shown in FIG. 4C, cam 73 has been returned to its retracted position, so that the next sequential pop-up lug assembly 63 traveling along the path of travel will stay within first cam track 77, and pop-up lug 92 will thus remain in the lowered position rather than being moved into the raised position with respect to the transport surface of the conveyor chain.

A second actuating assembly for guiding cam follower 100 into second cam track 78 would be to dispense with cam 73 entirely, and have a rotatable guide supported on the packaging machine in place of the cam, as illustrated in FIGS. 10A, 10B, and 11. As shown in FIG. 10A, a rotatable guide piece 120 is pivotally supported on the framework of the packaging machine and used as the actuating mechanism for guiding pop-up lug assemblies 63 into the raised position from the lowered position. Guide piece 120 has a first angled track 122 defined in its external surface for guiding cam follower 100 of pop-up lug assembly 63 upward toward and into second cam track 78, thus moving pop-up lug 92 into its raised position with respect to the transport surface of the conveyor chain (not illustrated), the raised position of the pop-up lug being shown generally in FIG. 10A.

If it is desired to leave pop-up lug assembly 63 in its lowered position as shown in FIG. 10B, guide piece 120 will be rotated, either manually or with a separate actuator (not illustrated), for example a servo drive or a geared or belted drive arrangement, so that a second linear track 124 defined within the external surface of guide piece 120 receives cam follower 100 thereon and passes the cam follower from first cam track 77 to first cam track 77, thus holding pop-up lug 92 in its lowered position. Guide piece 120 is used manually by releasing detent assembly 126, rotating the guide piece about pin/spindle 125, and re-engaging the detent assembly, while either positioning the upstream end of second track 124 in alignment with first cam track 77 for the lowered position, or positioning the upstream end of first track 122 in alignment with first cam track 77 for the raised position, first track 122 being aligned at its opposite end with second cam track 78.

Yet another actuating assembly is shown in FIGS. 12A and 12B. The actuator assembly of FIGS. 12A and 12B has a guide piece 130 positioned on the framework of the packaging machine with respect to first cam track 77 at the upstream end of the guide piece directed into the path of travel, and with respect to first cam track 77 and second cam track 78 at its downstream end extending along the path of travel. Guide piece 130 is restrained from horizontal movement, and is slidably moved upward (FIG. 12A) and downward (FIG. 12B) by a double-action pneumatic cylinder 132, cylinder 132 itself being mounted on the framework of the packaging machine. Guide piece 130 is mounted at the end of a cylinder rod 133 extending from cylinder 132.

When it is desired to move the cam follower (not illustrated) of a pop-up lug assembly (not illustrated) upward toward and into second cam track 78 for moving the pop-up lug into its raised position, rod 133 is drawn toward cylinder 132 so that guide piece 130 rests on first cam track 77, illustrated in FIG. 12A. In this position the guide piece will direct the cam follower upward over the guide piece and into second cam track 78. As shown in FIG. 12B, when it is desired to hold a pop-up lug assembly (not illustrated) in its lowered position, rod 133 is extended so that guide piece 130 is moved upward into second cam track 78, the bottom of the guide piece forming the top edge of first cam track 77 to ensure that the cam follower (not illustrated) of the pop-up lug assembly moves along the path of travel within cam track 77 without the opportunity to "jump" from the first cam track to second cam track 78. As with actuating assembly 68 shown in FIGS. 4A through 4C, the actuating assembly of FIGS. 12A and 12B is particularly well suited for high speed/automated operations in which the pitch of the conveyor belt assembly may be randomly varied to suit production requirements.

Thus, a unique feature of conveyor belt assembly 12 is the nearly infinite variation of pitches which can occur along the length of the conveyor chain, the number of pitch combinations being limited only by the spacing of the pop-up lug assemblies along conveyor chains 61 and 62, respectively. For example, if pop-up lugs 92 are spaced apart a distance of 100 mm along the length of conveyor chains 61 and 62, raising every lug results in a pitch of 100 m., raising every other lug results in a pitch of 200 mm., and raising every third lug will result in a pitch of 300 mm. along the conveyor belt assembly. Moreover, with the packaging machine actuating assemblies of FIGS. 4A–4C, and FIGS. 12A and 12B, the pitch between lugs can be varied along the conveyor as desired by the packaging machine operator. Thus, this packaging machine provides a unique conveyor belt assembly allowing an almost infinite number of pitch variations when contrasted to packaging machines known in the art.

FIGS. 8 and 9 illustrate the construction of chains 84 and modular table-top lugs 65 which form a part of conveyor chains 61 and 62. Chain 84 is an endless chain, having alternating first pairs of links 85 and second pairs of links 86, each adjacent pair of links being connected to one another by a cross link 88. Each modular table-top lug 65 is constructed to be snapped onto each cross link 88 along the length of conveyor chains 61 and 62, with the exception of those portions of the conveyor chain which include pop-up lug assemblies 63.

Referring to FIGS. 8 and 9, each modular table-top lug 65 has a generally planar body 102 of quadrilateral, i.e., rectangular shape in which three recessed channels 103, best shown in FIG. 8, are defined and which extend along the length of body 102 in the anticipated direction of travel along path of travel P. Thus, a spaced series of raised surface sections 104 are present adjacent channels 103. An opposed pair of legs 106 extend downwardly from planar body 102, each leg containing an arcuate notched portion 107, best shown in FIGS. 4A through 4C, constructed to be urged over each cross link 88 to be positioned on chain 84.

First pairs of links 85 and second pairs of links 86 of chain 84 are conventional, as is cross link 88, with the exception that cross link 88 is sized to extend transversely with respect to pairs of links 85 and 86 along the path of travel to the extent that it coincides with the size of modular table-top lug 65 and the position of legs 106 extending downwardly therefrom, so that arcuate notched portion 107 passes centrally over cross link 88.

By forming channels 103 in planar body 102, the amount of planar body 102 subjected to wear during packaging operations is limited to those surfaces of raised sections 104. The raised surfaces are also provided for use with, as well as being sized and shaped to pass through, the comb plates positioned at the upstream and downstream ends of conveyor chains 61 and 62 used for transitioning groups of beverage containers on and off of the conveyor chains, as is known to those skilled in the art. However, a unique feature of this raised construction, along with accompanying recesses or channels 103 focuses with the manner in which the conveyor chain is moved along return guide 59, best shown in FIGS. 2A and 2B. Return guide 59 is constructed to have a spaced series of raised ridges formed thereon (not illustrated) so that each of channels 103 is received on these raised ridges, and as chain 84 is moved back toward the infeed end 8 of the packaging machine along the path of travel, channels 103 are received on return guide 59 for more positively controlling, i.e., guiding, the chain as it is moved toward infeed end 8.

An additional feature of each modular table-top lug 65 is that each lug is constructed to be individually and yieldably urged over a cross link 88, whereupon a single damaged modular table-top lug 65 can be easily and quickly removed from chain 84 and replaced thereon when needed without the need to remove the chain from the packaging machine, or the need to disassemble any portion of chain 84. Each modular table-top lug 65, as well as the raised portions of chain return guide 59 is constructed of an acetal plastic or other engineering polymer, to include for example delrin and similar materials. An advantage in using an engineering polymer in the construction of table-top lugs 65 and or the raised portions of chain return guide 59 is that a low friction beating surface is provided for the return of chain conveyors 61 and 62 along their respective chain return guides.

Unless otherwise specified, the components of packaging machine 5 described herein are generally conventional. It is anticipated that drive motor 26 which powers drive shafts 30 and 34 will be a servomotor, as will conveyor belt assembly drive motor 52. Although a belted drive is used for powering drive shaft gear box 28 as well as conveyor belt assembly drive sprocket 55, these mechanisms could just as well be powered by a solid mechanical drive, or by a fluid drive if so desired. In addition, and although not illustrated herein, it is anticipated that a series of limit switches could be used for signaling the relative lateral movement of conveyor chains 61 and 62 with respect to one another and with respect to axis A, as well as the lateral movement of accessory rails 14 with respect to conveyor chains 61 and 62. These limit switches may be hardware switches positioned on the machine, or may be programmable limit switches included in the control software used for the operation of packaging machine 5. It is anticipated that packaging machine 5 will be equipped with a computer or processor (not illustrated) which will automatically operate packaging machine 5, as disclosed above.

While a preferred embodiment of the invention has been disclosed in the foregoing specification, it is understood by those skilled in the art that variations and modifications thereof can be made without departing from the spirit and scope of the invention, as set forth in the following claims. Moreover, the corresponding structures, materials, acts, and equivalents of all means or steps-plus function elements and the claimed elements, are intended to include any structure, material, or acts for performing the functions in combination with other claimed elements as specifically claimed.

We claim:

1. A packaging machine for packaging a series of groups of generally cylindrical containers moved along a path of travel through the packaging machine, the packaging machine having a means to pass separate carton blanks downwardly over each group of containers as it is moved along the path of travel, each carton blank having at least one pre-scored flap area defined therein, the series of containers having a diameter and a radius which may differ from series to series of groups of containers, the packaging machine including an elongated framework, an infeed end supported on the framework, a spaced discharge end, the infeed end of the packaging machine being supplied with a random series of the containers from an untimed mass flow conveyor, the packaging machine including means for forming the random series of containers into phased groups of containers delivered to the path of travel, said packaging machine comprising:

a variable pitch lugged conveyor belt assembly supported on the framework along the path of travel constructed and arranged to receive groups of containers from the infeed end of the packaging machine, said conveyor belt assembly having a pair of spaced conveyor chains forming a generally horizontal transport surface and including a spaced series of lugs along the length thereof, each of said lugs being constructed and arranged for individual and reciprocal movement from a lowered position flush with respect to said transport surface into a raised position extending above said transport surface for forming flights therebetween along said conveyor belt assembly;

a flighted side lug conveyor assembly positioned downstream of said conveyor belt assembly, said side lug conveyor assembly being constructed and arranged to receive groups of containers from said conveyor belt assembly;

at least one modular tab folding assembly positioned adjacent the path of travel, said tab folding assembly being constructed and arranged to fold the flaps of the prescored carton blanks inwardly toward the group of containers;

a pair of accessory rails supported on the framework of the packaging machine and being spaced equally from the path of travel, each of said accessory rails including an elongated side guide mounted thereon, said side guides being spaced equally from the path of travel on opposite sides of said conveyor belt assembly;

wherein said side lug conveyor and said tab folding assembly are each supported on said accessory rails; and means for moving said accessory rails laterally toward and away from the path of travel.

2. The packaging machine of claim 1, further comprising a conveyor chain tensioning assembly, said tensioning assembly being constructed and arranged to take up slack and to tension each of said conveyor chains.

3. The packaging machine of claim 1, further comprising means for moving said variable pitch lugged conveyor belt assembly chain along the path of travel from the infeed end toward the discharge end of the packaging machine.

4. The packaging machine of claim 1, said variable pitch lugged conveyor belt assembly further comprising a cam means for selectively urging said lugs from said lowered position into said raised position, each of said lugs including cam follower means for being guided by said cam means, whereby at least one of said lugs may be urged into said raised position by said cam means for varying the pitch of said lugs along the length of the conveyor chain.

5. The packaging machine of claim 4, said cam means further comprising actuating means for urging said at least one lug from said lowered position into said raised position.

6. The packaging machine of claim 1, said variable pitch lugged conveyor belt assembly comprising a pair of spaced, parallel, and generally horizontal endless variable pitch lugged conveyor chains, each of said conveyor chains being equally spaced from a longitudinal axis formed between the conveyor chains and extending along the path of travel from the infeed end toward the discharge end of the packaging machine, each of said conveyor chains lying in a common horizontal plane with respect to one another.

7. The packaging machine of claim 6, said variable pitch lugged conveyor belt assembly further comprising means for moving said conveyor chains laterally toward and away from each other.

8. The packaging machine of claim 7, wherein said means for moving said accessory rails toward and away from the path of travel is constructed and arranged to simultaneously move said accessory rails laterally toward and away from the path of travel as said conveyor chains are being laterally moved toward and away from each other.

9. The packaging machine of claim 7, wherein said pair of conveyor chains move laterally toward and away from each other, and said pair of side guides move laterally toward and away from said pair of conveyor chains, respectively, at a ratio equal to the radius of the containers conveyed on said conveyor chains to the diameter of the containers within each group of containers conveyed on said conveyor chains.

10. The packaging machine of claim 6, wherein each of said conveyor chains has a longitudinal centerline parallel to said longitudinal axis, said centerlines for each of said conveyor chains being spaced from said axis at a distance generally equal to the radius of the containers conveyed on the conveyor chains.

11. The packaging machine of claim 10, wherein each of said side guides is spaced from said longitudinal axis at a distance generally equal to the diameter of the containers conveyed on said conveyor chains.

12. A method of packaging a series of groups of generally cylindrical containers moved along a path of travel through a packaging machine, the packaging machine having a means to pass separate carton blanks downwardly over each group of containers as it moves along the path of travel, the carton blanks having at least one prescored flap area defined therein, the containers within each series of groups of containers having a diameter and a radius which may differ from series to series, the packaging machine including an elongated framework, an infeed end supported on the framework, a spaced discharge end, the infeed end of the packaging machine being supplied with a random series of containers from an untimed mass flow conveyor, the packaging machine also having means for forming the random series of containers into phased groups of containers delivered to the path of travel, said method of packaging including the steps of:

moving separate groups of containers along the path of travel with a variable pitch lugged conveyor belt assembly supported on the framework from the infeed end of the packaging machine toward a flighted side lug conveyor assembly positioned on the framework downstream of said conveyor belt assembly;

providing a spaced series of lugs along the length of said conveyor belt assembly;

positioning said lugs in a lowered position flush with respect to said conveyor belt assembly;

selectively moving at least one of said lugs into a raised position extended above said conveyor belt assembly and forming at least one flight along the length of said conveyor belt assembly;

moving the groups of containers along the path of travel within said at least one flight;

moving the group of containers along the path of travel with said flighted side lug conveyor assembly toward at least one modular tab folding assembly positioned on the framework adjacent the path of travel;

equally spacing a pair of accessory rails supported on the framework from the path of travel, providing a pair of side guides mounted one each on said accessory rails, respectively, and spacing said side guides on opposite sides of said conveyor belt assembly; and moving said accessory rails laterally toward and away from the path of travel in response to a series of groups of containers having a different diameter and radius from series to series of groups of containers.

13. The method of claim 12, including the steps of, providing said variable pitch lugged conveyor belt assembly with a pair of spaced, parallel, and generally horizontal variable pitch endless conveyor chains;

spacing each of said conveyor chains equally from a longitudinal axis formed between said conveyor chains and extending along the path of travel;

positioning said conveyor chains in a common horizontal plane with respect to one another; and laterally moving said conveyor chains toward and away from each other.

14. The method of claim 13, comprising the step of simultaneously moving said accessory rails laterally toward and away from the path of travel as said conveyor chains are laterally moved toward and away from said longitudinal axis, respectively.

15. The method of claim 13, comprising the step of laterally moving said pair of conveyor chains toward and away from each other with respect to the lateral movement of said pair of side guides positioned on said accessory rails using a ratio equal to the radius of the containers conveyed on said conveyor chains to the diameter of the containers conveyed on said conveyor chains.

16. The method of claim 13, comprising the steps of moving said conveyor chains laterally toward said longitudinal axis and adjacent one another, forming a single conveyor chain in response thereto, and spacing each of said side guides, respectively, from said axis a distance generally equal to the radius of the containers being moved on said single conveyor chain.

\* \* \* \* \*